(12) United States Patent
Ohara

(10) Patent No.: US 12,177,903 B2
(45) Date of Patent: Dec. 24, 2024

(54) USER APPARATUS AND BASE STATION APPARATUS

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 297 days.

(21) Appl. No.: 17/047,340

(22) PCT Filed: Apr. 16, 2019

(86) PCT No.: PCT/JP2019/016354
§ 371 (c)(1),
(2) Date: Oct. 13, 2020

(87) PCT Pub. No.: WO2019/203242
PCT Pub. Date: Oct. 24, 2019

(65) Prior Publication Data
US 2021/0120591 A1    Apr. 22, 2021

(30) Foreign Application Priority Data

Apr. 18, 2018    (JP) .................................. 2018-080215

(51) Int. Cl.
*H04W 74/0833*    (2024.01)
*H04W 72/0446*    (2023.01)

(52) U.S. Cl.
CPC ... *H04W 74/0833* (2013.01); *H04W 72/0446* (2013.01)

(58) Field of Classification Search
CPC ...................... H04W 74/0833; H04W 72/0446
See application file for complete search history.

(56) References Cited

U.S. PATENT DOCUMENTS

| 2015/0358138 | A1  | 12/2015 | Hwang et al. |
| 2017/0373728 | A1* | 12/2017 | Viering ................ H04B 7/0632 |
| 2019/0037509 | A1* | 1/2019  | Li ........................ H04W 56/001 |
| 2019/0208550 | A1* | 7/2019  | Ko ........................ H04L 5/0094 |

FOREIGN PATENT DOCUMENTS

| JP | 2015-537422 A | 12/2015 |
| WO | 2014055878 A1 | 4/2014 |

OTHER PUBLICATIONS

3GPP TSG RAN WG1 Meeting #92, "Remaining details of PRACH Resource Configuration", Feb. 26, 2018, R1-1801409 (Year: 2018).*

(Continued)

*Primary Examiner* — Siren Wei
(74) *Attorney, Agent, or Firm* — Osha Bergman Watanabe & Burton LLP

(57) ABSTRACT

A terminal includes: a receiver configured to receive, from a base station apparatus, first configuration information indicating an Uplink, a Downlink, or a Flexible area in a radio frame, and second configuration information indicating a random access channel (RACH) resource allocation in the radio frame in a time domain; a processor configured to identify an available RACH resource in the radio frame based on the first configuration information and the second configuration information; and a transmitter configured to transmit a preamble to the base station apparatus using the identified available RACH resource.

8 Claims, 16 Drawing Sheets

A) CASE: SS BLOCK SUB-CARRIER SPACING IS 15 kHz; AND FREQUENCY BAND IS BETWEEN 0 Hz AND 3 GHz

B) CASE: SS BLOCK SUB-CARRIER SPACING IS 15 kHz; AND FREQUENCY BAND IS BETWEEN 3 GHz AND 6 GHz (INSIDE OF SLOT IS THE SAME AS CASE A)

(56) References Cited

OTHER PUBLICATIONS

3GPP TSG RAN WG1#92, "Remaining details on PRACH formats", Feb. 26, 2018, R1-1802021 (Year: 2018).*
Extended European Search Report issued in counterpart European Patent Application No. 19787847.3, mailed on Dec. 21, 2021 (10 pages).
ZTE, Sanechips; "Remaining details of PRACH Resource Configuration"; 3GPP TSG RAN WG1 Meeting #92, R1-1801409; Athens, Greece; Feb. 26-Mar. 2, 2018 (21 pages).
Nokia, Nokia Shanghai Bell; "Remaining details on PRACH formats"; 3GPP TSG-RAN WG1#92, R1-1802021; Athens, Greece; Feb. 26-Mar. 2, 2018 (19 pages).
Convida Wireless; "Summary of Remaining details on PRACH formats"; 3GPP TSG RAN WG1 Meeting #92, R1-1803256; Athens, Greece; Feb. 26-Mar. 2, 2018 (33 pages).
International Search Report issued in PCT/JP2019/016354 mailed on Jul. 30, 2019 (3 pages).
Written Opinion of the International Searching Authority issued in PCT/JP2019/016354 mailed on Jul. 30, 2019 (3 pages).
3GPP TS 36.213 V14.4.0; "3rd Generation Partnership Project; Technical Specification Group Radio Access Network; Evolved Universal Terrestrial Radio Access (E-UTRA); Physical layer procedures (Release 14)" Sep. 2017 (462 pages).
3GPP TS 36.211 V14.4.0; "3rd Generation Partnership Project; Technical Specification Group Radio Access Network; Evolved Universal Terrestrial Radio Access (E-UTRA); Physical channels and modulation (Release 14)"; Sep. 2017 (197 pages).
Office Action issued in Indian Patent Application No. 202037046170 mailed on Dec. 3, 2021 (6 pages).
CMCC, "Discussion on PRACH configuration table" 3GPP TSG RAN WG1 Meeting #92, R1-1802032, Athens, Greece, Feb. 27-Mar. 2, 2018 (16 pages).
Notice of Reasons for Refusal issued in Japanese Application No. 2020-514403 mailed on Dec. 7, 2021 (4 pages).
ZTE, Sanechips, "Summary of PRACH Remaining details on PRACH formats" 3GPP TSG RAN WG1 Meeting 90 bis, R1-1719114, Prague, CZ, Oct. 9-13, 2017 (29 pages).
Office Action issued in Indonesian Patent Application No. P00202008443 mailed on Dec. 27, 2022 (6 pages).
Office Action issued in the counterpart Egyptian application No. 2020101607, mailed Feb. 14, 2023 (7 pages).
Office Action in the corresponding Egyptian patent application No. 2020101607, mailed Jun. 14, 2023 (8 pages).
Office Action issued in Colombian Patent Application No. NC2020/0014068 mailed on Apr. 29, 2024 (19 pages).
Office Action issued in counterpart Chinese Patent Application No. 201980022638.6 mailed on Mar. 1, 2024 (19 pages).
Office Action issued in counterpart European Patent Application No. 19 787 847.3 mailed on Mar. 11, 2024 (7 pages).

* cited by examiner

FIG.5
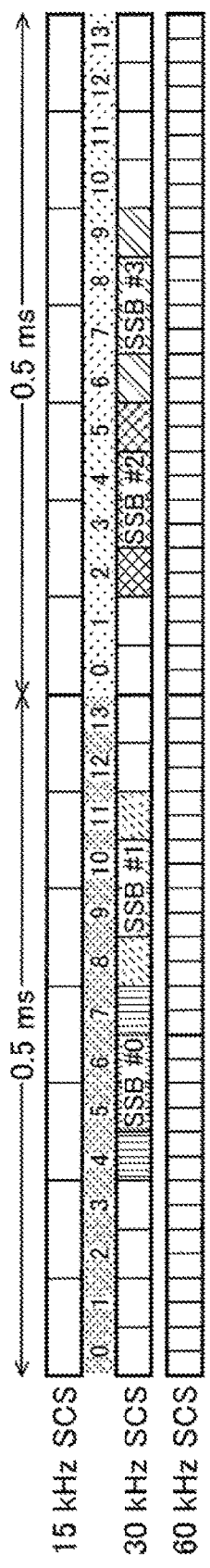
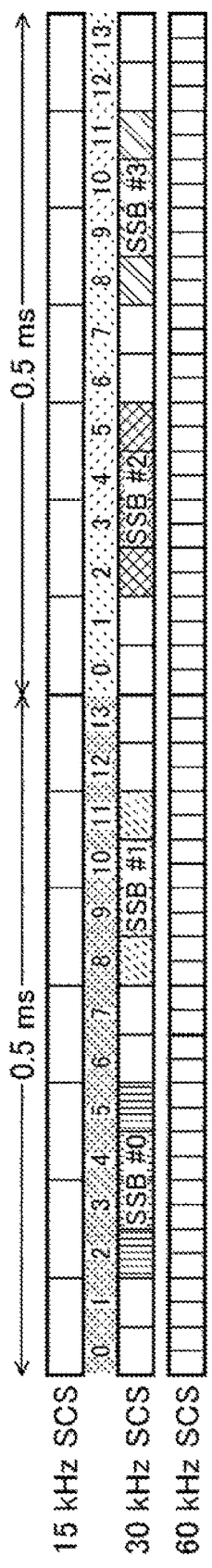
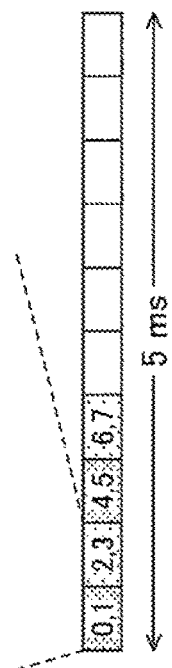
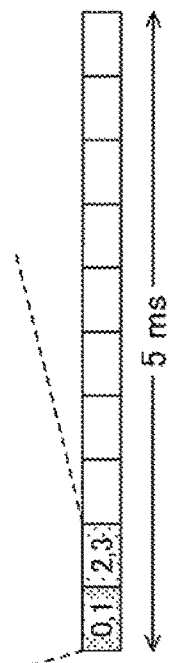

FIG.6
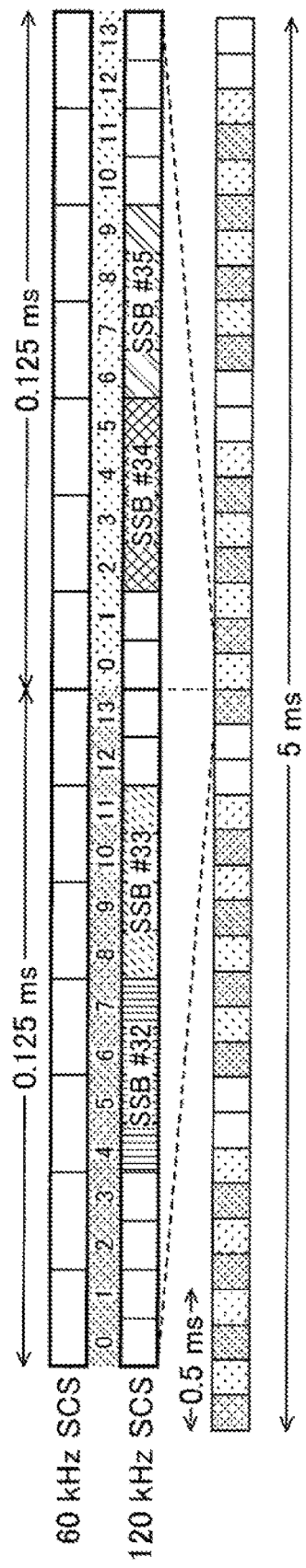
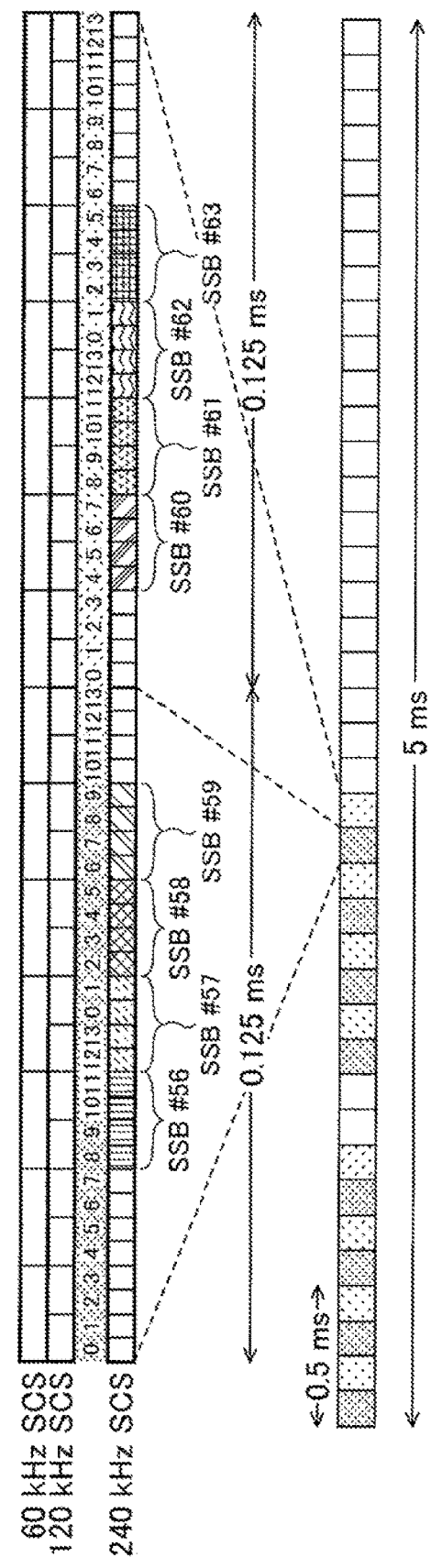

FIG.8

| Format | Downlink | Downlink slot | | Not uplink | Uplink slot | |
| --- | --- | --- | --- | --- | --- | --- |
| | | Unknown | Not downlink | | Unknown | Uplink |
| 0 | – | 0–13 | – | – | – | – |
| 1 | 0–13 | – | – | – | – | 0–13 |
| 2 | 0–13 | – | – | – | – | – |
| 3 | – | – | – | – | – | 0–13 |
| 4 | 0 | 1–12 | 13 | 0 | 1–12 | 13 |

USER APPARATUS AND BASE STATION APPARATUS

BACKGROUND OF THE INVENTION

1. Field of the Invention

The present invention relates to a user apparatus and a base station apparatus in a wireless communication system.

2. Description of the Related Art

In the 3GPP (3rd Generation Partnership Project), a wireless communication method called 5G or NR (New Radio) (hereinafter referred to as "NR") for further increasing the capacity of the system, for further increasing the data transmission speed, and for further reducing the delay in the wireless section has been discussed. In NR, various wireless technologies have been discussed in order to meet requirements including latency equal to or less than 1 ms in a wireless section while realizing a throughput equal to or greater than 10 Gbps.

In NR, in initial access in which a user apparatus (terminal) establishes a connection between the user apparatus and a base station apparatus, the user apparatus detects a cell according to a synchronization signal transmitted from the base station apparatus, identifies the cell, and obtains a part of system information necessary for the initial access (e.g., Non-Patent Document 1).

Further, in NR, it is expected that a wide range of frequencies, from a low frequency band similar to LTE (Long Term Evolution) to a frequency band that is higher than LTE, will be used. In particular, because the propagation loss increases in the high frequency band, it has been discussed to apply narrow beam forming in order to compensate for the propagation loss (e.g., Non-Patent Document 2).

CITATION LIST

Non-Patent Document

[Non-patent Document 1] 3GPP TS 36.213 V14.4.0 (2017-09)
[Non-patent Document 2] 3GPP TS 36.211 V14.4.0 (2017-09)

SUMMARY OF THE INVENTION

Technical Problem

In NR, a synchronization signal and a part of system information required for initial access are mapped to a wireless frame with a resource unit called an SS block (Synchronization Signal block) including consecutive OFDM (Orthogonal Frequency Division Multiplexing) symbols. A user apparatus obtains information necessary for the initial access by receiving the SS block transmitted from a base station apparatus. The information necessary for the initial access includes information that specifies a RACH (Random Access Channel) resource and a preamble signal format.

Further, in NR, the base station apparatus transmits multiple beams by applying the beamforming. The user apparatus receives an SS block that is associated with the beam and obtains information necessary for the initial access. A RACH resource is associated with the SS block. Further, in NR, with respect to symbols of slots included in a radio frame, it is possible to flexibly set as DL (Downlink) or UL (Uplink).

As a result, in the case of indicating, to the user apparatus, available RACH resources that correspond to NR SS block arrangement and DL/UL configuration, there is a problem in that the signaling overhead increases if the entire information for specifying the RACH resources needs to be indicated, the entire information being positions of the RACH resources in the time domain and the frequency domain, preamble indexes, associated SS blocks, etc.

The present invention has been made in view of the above. It is an object of the present invention to efficiently indicate available resources to the user apparatus in the initial access of a wireless communication system.

Solution to Problem

According to an embodiment of the present invention, a user apparatus that communicates with a base station apparatus via a radio frame is provided. The user apparatus includes: a reception unit configured to receive, from the base station apparatus, a TDD-UL-DL-Configuration indicating UL (Uplink), DL (Downlink), or Unknown area in the radio frame, information related to a RACH configuration table indicating a RACH resource allocation in the radio frame in a time domain, and information excluding unavailable RACH resources in the radio frame in the time domain; a control unit configured to identify an available RACH resource based on the TDD-UL-DL-Configuration indicating UL, DL, or Unknown area in the radio frame, the information related to the RACH configuration table, and the information excluding the unavailable RACH resources; and a transmission unit configured to transmit a preamble to the base station apparatus by using the identified available RACH resource.

Advantageous Effects of Invention

According to an embodiment of the present invention, it is possible to efficiently indicate available resources to the user apparatus in the initial access of a wireless communication system.

BRIEF DESCRIPTION OF THE DRAWINGS

FIG. 5 is a drawing illustrating a configuration example (2) of an SS burst set according to an embodiment of the present invention.

FIG. 6 is a drawing illustrating a configuration example (3) of an SS burst set according to an embodiment of the present invention.

FIG. 8 is an example (1) of a slot format in an embodiment of the present invention.

DETAILED DESCRIPTION OF THE PREFERRED EMBODIMENTS

Figure 1:
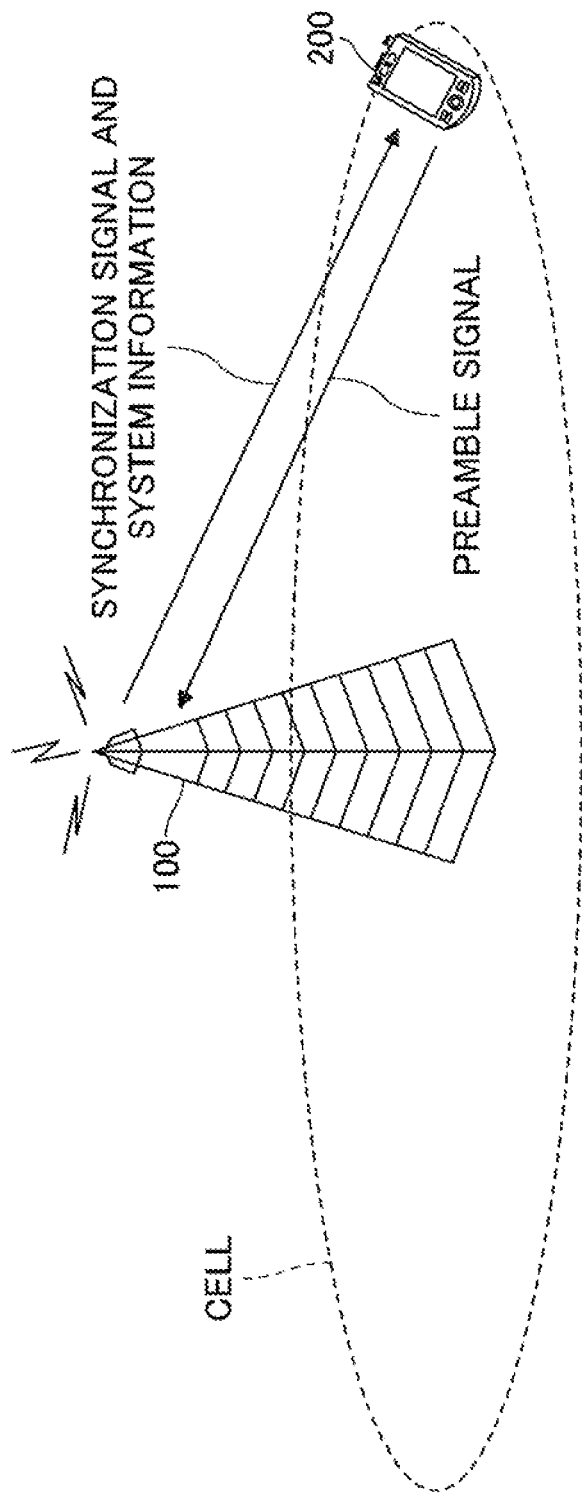
FIG. 1 is a drawing illustrating a configuration example (1) of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Further, in the following embodiments, the terms such as SS (Synchronization Signal), PSS (Primary SS), SSS (Secondary SS), PBCH (Physical broadcast channel), PRACH (Physical RACH), etc., are used for the sake of convenience. The signals, functions, etc., similar to the above, may be referred to by different terms. Further, the above-described terms used in NR will be referred to as "NR-SS", "NR-PSS", "NR-SSS", "NR-PBCH", "NR-PRACH", etc.

FIG. 1 is a drawing illustrating a configuration example of a wireless communication system according to an embodiment of the present invention. As illustrated in FIG. 1, the wireless communication system includes a base station apparatus 100 and a user apparatus 200. In FIG. 1, a single base station apparatus 100 and a single user apparatus 200 are illustrated as examples. There may be a plurality of the base station apparatuses 100 and a plurality of the user apparatuses 200.

The base station apparatus 100 is a communication apparatus that provides one or more cells and performs wireless communications with the user apparatus 200. As illustrated in FIG. 1, the base station apparatus 100 transmits a synchronization signal and system information to the user apparatus 200. The synchronization signal is, for example, an NR-PSS and an NR-SSS. The system information is transmitted via, for example, a NR-PBCH. Further, the system information may be referred to as broadcast information. The base station apparatus 100 and the user apparatus 200 are enabled to transmit and receive a signal by performing the beamforming. The user apparatus 200 is a communication apparatus, that has a wireless communication function, such as a smart-phone, a mobile phone, a tablet, a wearable terminal, an M2M (Machine-to-Machine) communication module, etc. The user apparatus 200 is wirelessly connected to the base station apparatus 100, and uses various communication services provided by the wireless communication system. As illustrated in FIG. 1, in an initial access stage, the user apparatus 200 transmits a random access preamble signal to the base station apparatus 100. The random access is performed based on RMSI (Remaining minimum system information) in addition to the system information received from the base station apparatus 100 via NR-PBCH. The RMSI is system information that is received via NR-PDSCH (Physical downlink shared channel) that is scheduled according to NR-PDCCH (Physical downlink control channel). The RMSI includes, for example, information necessary for the initial access, such as a RACH setting.

It should be noted that, in an embodiment of the present invention, the duplex method may be TDD (Time Division Duplex), FDD (Frequency Division Duplex), or other methods (e.g., Flexible Duplex, or the like).

Further, in the following descriptions, "transmitting a signal using a transmission beam" may be referred to as "transmitting a signal that is multiplied by a precoding vector (or, that is precoded using a precoding vector)". Similarly, "receiving a signal using a reception beam" may be referred to as "multiplying a received signal by a weight vector". Further, "transmitting a signal using a transmission beam" may be referred to as "transmitting a signal via specific antenna ports". Similarly, "receiving a signal using a reception beam" may be referred to as "receiving a signal via specific antenna ports". The antenna port refers to a logical antenna port or a physical antenna port defined in 3GPP standards. It should be noted that methods in which the transmission beam and the reception beam are formed are not limited to the methods described above. For example, the base station apparatus 100 and the user apparatus 200 with multiple antennas may use a method of changing angles of antennas, respectively, may use a method combining a method of using a precoding vector and a method of changing angles of antennas, may use different antenna panels by switching them, may use a method in which a method of using multiple antenna panels is combined, or may use other methods. Further, for example, multiple transmission beams different from each other may be used in a high frequency band. An operation using multiple transmission beams is referred to as a "multi-beam operation", and an operation using a single transmission beam is referred to as a "single-beam operation".

Embodiment

In the following, one or more embodiments will be described.

Figure 2:
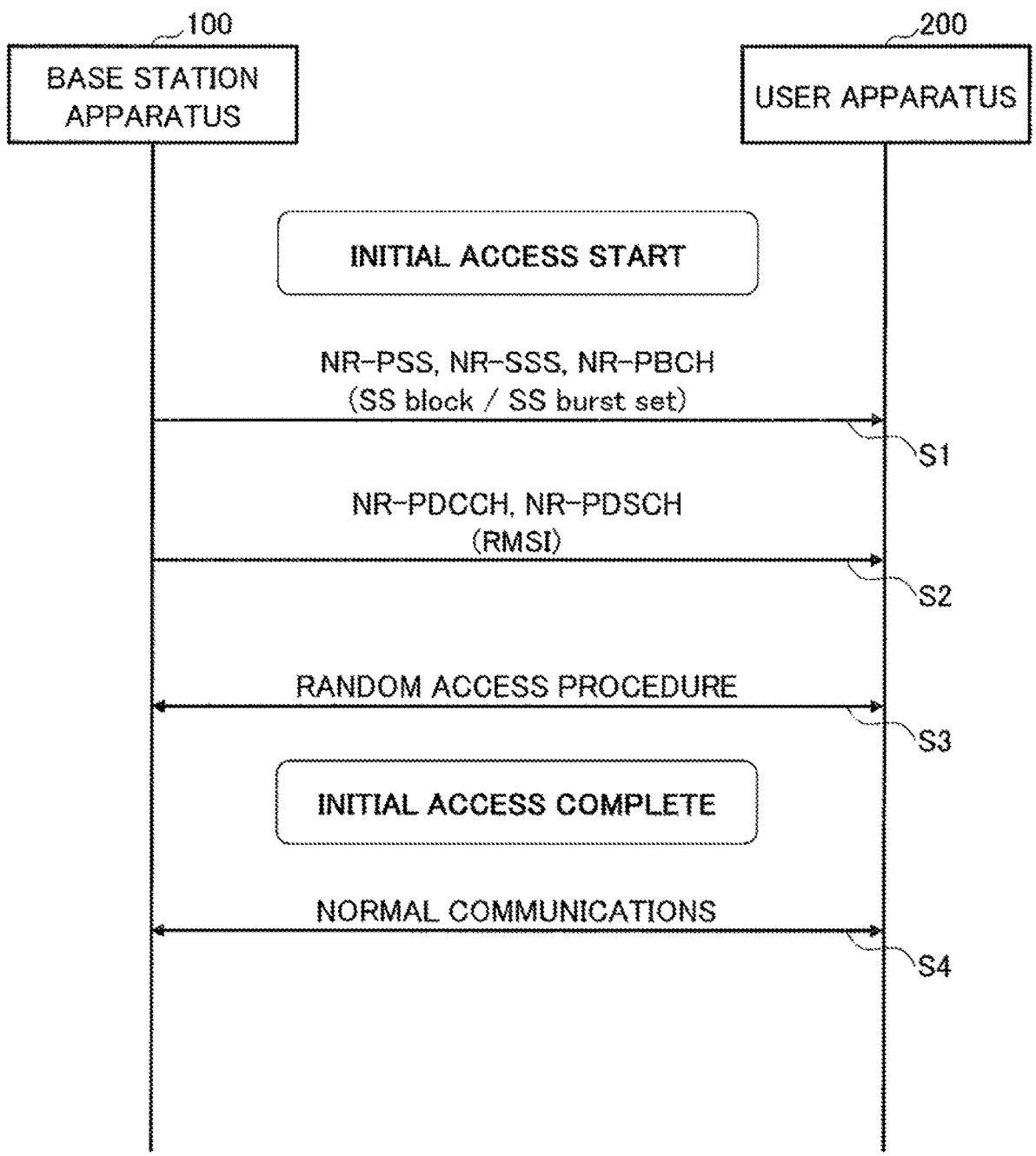
FIG. 2 is an example of an initial access sequence according to an embodiment of the present invention.

FIG. 2 is an example of an initial access sequence according to an embodiment of the present invention. When initial access is started, in step S1, the base station apparatus 100 transmits an NR-PSS, an NR-SSS, and an NR-PBCH (i.e., SS block) to the user apparatus 200. The NR-PBCH includes a part of system information. The base station apparatus 100 repeatedly transmits an SS burst set including multiple SS blocks to the user apparatus 200 at a cycle of SS burst set periodicity. In the case where multiple SS blocks are included in a SS burst set, the multiple SS blocks may be associated with corresponding different beams under the multi-beam operation environment.

With respect to the above, the user apparatus 200 receives the NR-PSS transmitted from the base station apparatus 100, and uses the NR-PSS for identifying at least a part of an initial time, a frequency synchronization, and a cell ID (identity). Further, the user apparatus 200 receives the NR-SSS transmitted from the base station apparatus 100, and uses the NR-SSS for identifying at least a part of the cell ID. Further, the user apparatus 200 obtains information used for obtaining a part of system information necessary for the initial access (e.g., a system frame number (SFN), other system information RMSI, etc.) by receiving the NR-PBCH transmitted from the base station apparatus 100.

Subsequently, in step S2, other system information including the RMSI is received via a NR-PDSCH that is scheduled by a NR-PDCCH. The RMSI includes information that is used for identifying a resource for performing a random access procedure (i.e., RACH resource), a preamble format, etc.

In the case where an SS burst set includes multiple SS blocks, when the user apparatus 200 obtains an SS block, the user apparatus 200 starts a random access procedure by transmitting a preamble using a RACH resource that is associated with the SS block (S3).

When the random access procedure between the base station apparatus 100 and the user apparatus 200 is successful in step S3, the initial access is completed and a normal communication is started (S4).

Figure 3:
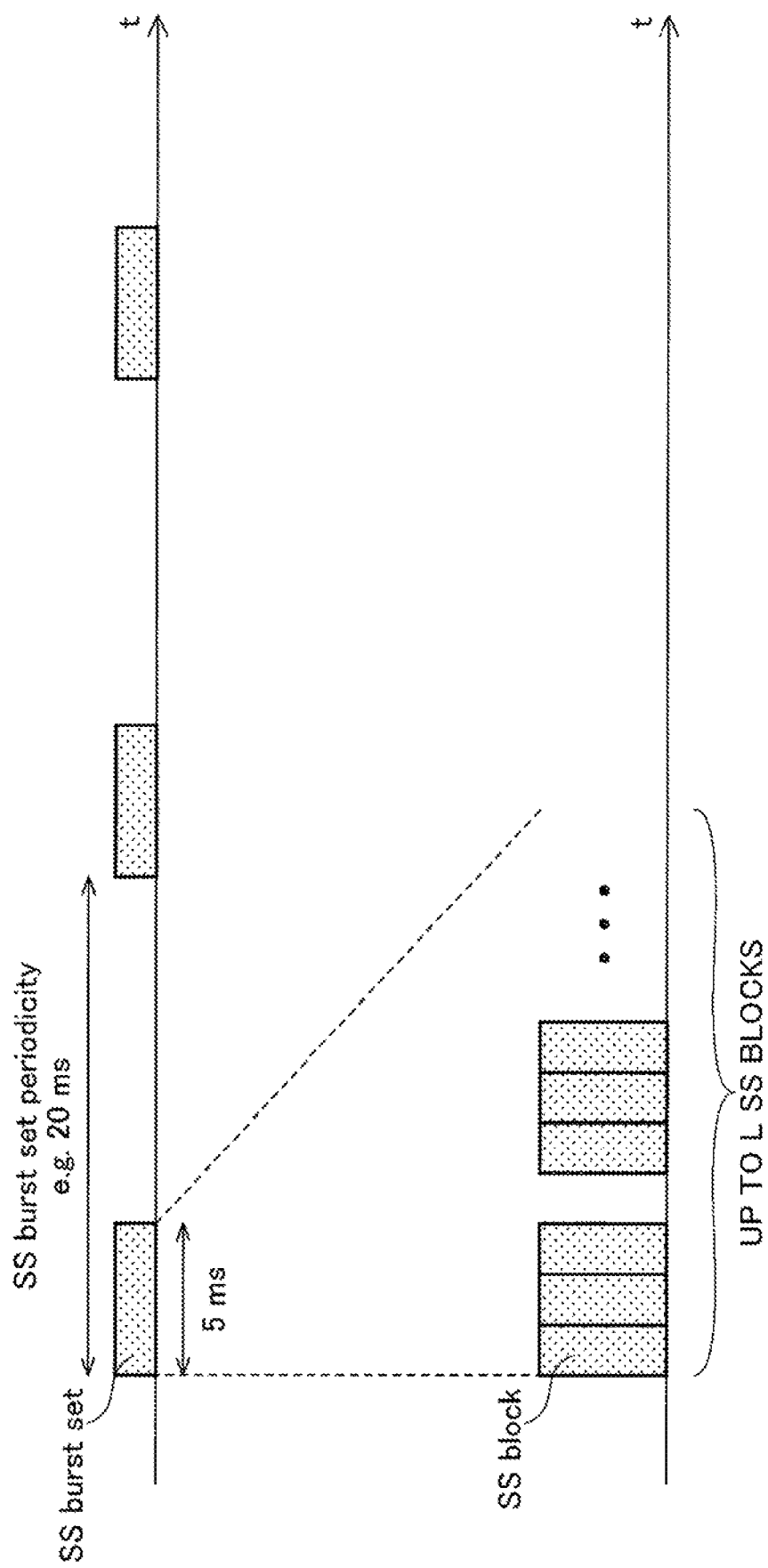
FIG. 3 is a drawing illustrating an SS burst set according to an embodiment of the present invention.

FIG. 3 is a drawing illustrating an SS burst set according to an embodiment of the present invention. As illustrated in FIG. 3, the SS burst set includes as many as one to L SS blocks. Resource candidates used for transmitting the SS blocks are included in a 5 ms period. It is not necessary for the SS blocks to be arranged in all of the L candidate positions in the SS burst set. The number of the SS blocks that are actually arranged and transmitted from the base station apparatus 100 may be equal to or less than L according to an actual operation. A resource at a candidate position, at which the SS block is not arranged, is used for normal communications. In other words, L indicates the maximum number of the SS blocks in a SS burst set. Further, L may be a different value according to a frequency band. For example, in a frequency band equal to or less than 3 GHz, L may be equal to 4, in a frequency band between 3 GHz and 6 GHz, L may be equal to 8, and, in a frequency band between 6 GHz and 52.6 GHz, L may be equal to 64.

Further, in an example illustrated in FIG. 3, "SS burst set periodicity", which indicates a cycle at which SS burst sets are transmitted, is 20 ms. The minimum value of the "SS burst set periodicity" may be 5 ms.

Figure 4:
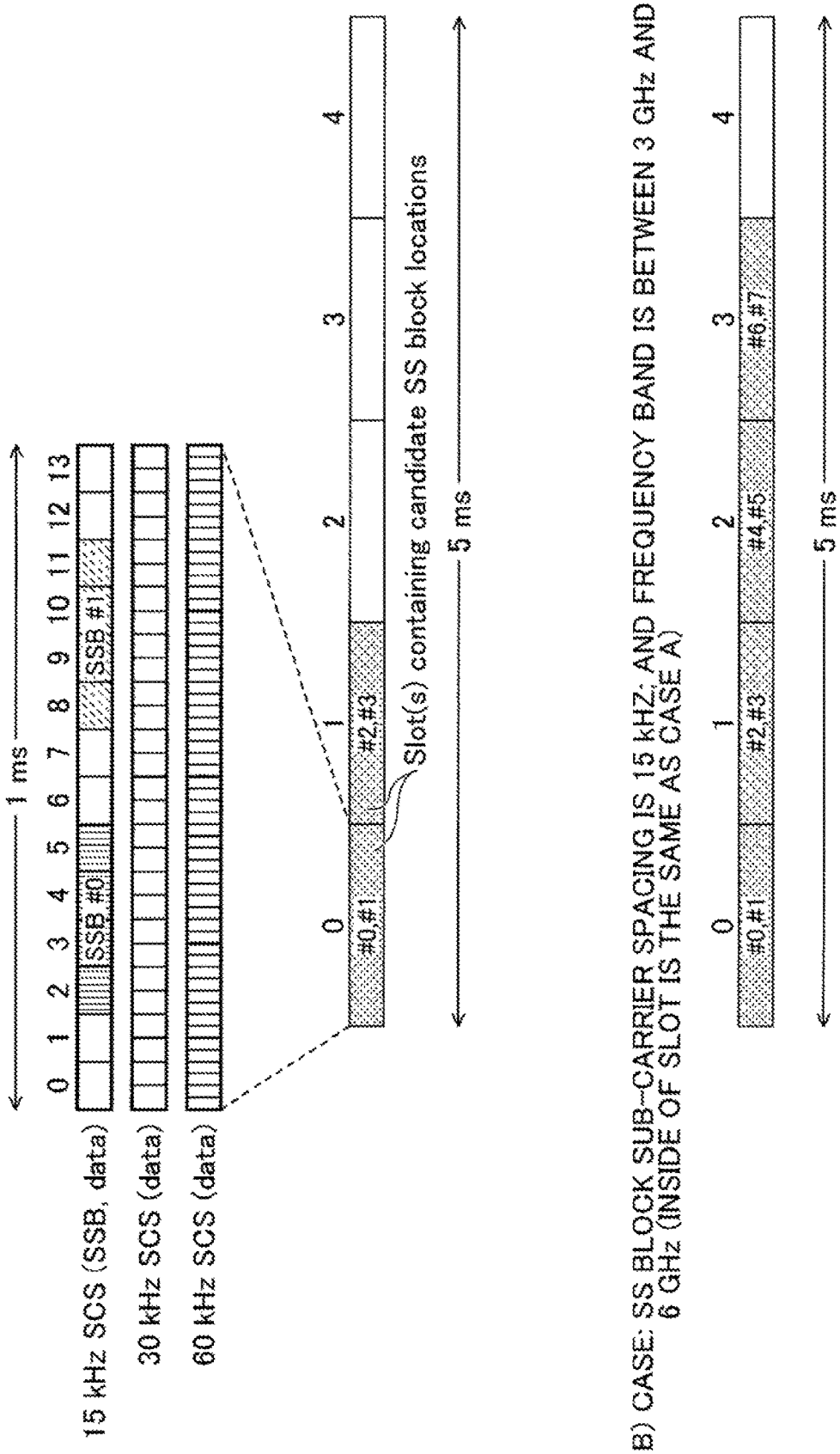
FIG. 4 is a drawing illustrating a configuration example (1) of an SS burst set according to an embodiment of the present invention.

FIG. 4 is a drawing illustrating a configuration example (1) of an SS burst set according to an embodiment of the present invention. In FIG. 4, an example is shown in which the SS burst set is arranged in a time unit of 5 ms or 1 ms in the radio frame.

FIG. 4A) is a configuration example of an SS burst set in the case where the sub-carrier spacing of radio signals via which SS blocks are transmitted is 15 kHz and where the frequency band is up to 3 GHz. The first two slots, of 5 slots corresponding to 5 ms, include SS blocks (hereinafter, referred to as "SSB"). SSB #0 and SSB #1 are arranged in slot #0, and SSB #2 and SSB #3 are arranged in slot #1. A slot with 1 ms slot length includes 14 symbols from symbol #0 to symbol #13. As illustrated in FIG. 4A), SSB #0 is arranged in the radio frame with 15 kHz SCS (sub-carrier spacing) from symbol #2 to symbol #5, and SSB #1 is arranged in the radio frame from symbol #8 to symbol #11. A radio frame with 15 kHz SCS is used for transmitting and receiving an SSB and data, and radio frames with 30 kHz SCS and 60 kHz SCS are used for transmitting and receiving data.

FIG. 4B) is a configuration example of an SS burst set in the case where the sub-carrier spacing of radio signals via which SS blocks are transmitted is 15 kHz and where the frequency band is between 3 GHz and 6 GHz. The first four slots, of the five slots corresponding to 5 ms, include SS blocks. SSB #0 and SSB #1 are arranged in slot #0, SSB #2 and SSB #3 are arranged in slot #1, SSB #4 and SSB #5 are arranged in slot #2, and SSB #6 and SSB #7 are arranged in slot #3. The arrangement of the SS blocks in the symbols in a slot may be the same as FIG. 4A).

FIG. 5 is a drawing illustrating a configuration example (2) of an SS burst set according to an embodiment of the present invention. In FIG. 5, examples are shown in which the SS burst set is arranged in a time unit of 5 ms or 1 ms in a radio frame.

FIG. 5A) is a configuration example of an SS burst set in the case where the sub-carrier spacing of radio signals via which SS blocks are transmitted is 30 kHz. SSB #0 is arranged in a slot from symbol #4 to symbol #7, and SSB #1 is arranged from symbol #8 to symbol #11. SSB #2 is arranged in the subsequent slot from symbol #2 to symbol #5, and SSB #3 is arranged from symbol #6 to symbol #9. SSB #0 to SSB #3 are arranged in the consecutive two slots. Radio frames with 30 kHz SCS are used for transmitting and receiving an SSB and data, and radio frames with 15 kHz SCS and 60 kHz SCS are used for transmitting and receiving data.

FIG. 5B) is another configuration example of an SS burst set in the case where the sub-carrier spacing of radio signals via which SS blocks are transmitted is 30 kHz. SSB #0 is arranged in a slot from symbol #2 to symbol #5, and SSB #1 is arranged from symbol #8 to symbol #11. SSB #2 is arranged in the subsequent slot from symbol #2 to symbol #5, and SSB #3 is arranged from symbol #8 to symbol #11. SSB #0 to SSB #3 are arranged in the consecutive two slots. Radio frames with 30 kHz SCS are used for transmitting and receiving an SSB and data, and radio frames with 15 kHz SCS and 60 kHz SCS are used for transmitting and receiving data.

FIG. 5C) illustrates an example of an SS burst set using slots in 5 ms in the case where the frequency band of radio signals used for transmitting SS blocks is between 0 Hz and 3 GHz by using slot units in 5 ms. It is assumed that the slots are indexed as slot #0 to slot #9 in the time order. As illustrated in FIG. 5C, SSB #0 and SSB #1 are arranged in slot #0, and SSB #2 and SSB #3 are arranged in slot #1.

FIG. 5D) illustrates an example of an SS burst set using slots in 5 ms in the case where the frequency band of radio signals used for transmitting SS blocks is between 3 GHz and 6 GHz. It is assumed that the slots are indexed as slot #0 to slot #9 in the time order. As illustrated in FIG. 5D), SSB #0 and SSB #1 are arranged in slot #0, SSB #2 and SSB #3 are arranged in slot #1, SSB #4 and SSB #5 are arranged in slot #2, and SSB #5 and SSB #7 are arranged in slot #3.

FIG. 6 is a drawing illustrating a configuration example (3) of an SS burst set according to an embodiment of the present invention. In FIG. 6, examples are shown in which the SS burst set is arranged in a time unit of 5 ms or 0.25 ms in a radio frame.

FIG. 6A) is a configuration example of an SS burst set in the case where the sub-carrier spacing of radio signals via which SS blocks are transmitted is 120 kHz and where frequency bands are between 6 GHz and 52.6 GHz. It is assumed that the slots in the figure illustrated by slot units in 5 ms are indexed as slot #0 to slot #39 in the time order. SSB #32 is arranged in slot #20 from symbol #4 to symbol #7, and SSB #33 is arranged from symbol #8 to symbol #11. SSB #34 is arranged in slot #22 from symbol #2 to symbol #5, and SSB #35 is arranged from symbol #6 to symbol #9. With the same configuration in slot, SSBs from #0 to #15 are arranged in slots from #0 to #7, SSBs from #16 to #31 are arranged in slots #10 to #17, SSBs from #32 to #47 are arranged in slots from #20 to #27, and SSBs from #48 to #63 are arranged in slots from #30 to #37. Radio frames with 120 kHz SCS may be used for transmitting and receiving SSBs and data, and radio frames with 60 kHz SCS may be used for transmitting and receiving data.

FIG. 6B) is a configuration example of an SS burst set in the case where the sub-carrier spacing of radio signals via which SS blocks are transmitted is 240 kHz and where frequency bands are between 6 GHz and 52.6 GHz. It is assumed that the slots in the figure illustrated by slot units in 5 ms are indexed as slot #0 to slot #79 in the time order. In the drawing of FIG. 6B), one square corresponds to two slots. SSB #56 is arranged in slot #32 from symbol #8 to symbol #11, SSB #57 is arranged in slots #32 and #33 from slot #32 symbol #12 to slot #33 symbol #1, SSB #58 is arranged in slot #33 from symbol #2 to symbol #5, and SSB #59 is arranged in slot #33 from symbol #6 to symbol #9. SSB #60 is arranged in slot #34 from symbol #4 to symbol #7, SSB #61 is arranged in slot #34 from symbol #8 to symbol #11, SSB #62 is arranged in slots #34 and #35 from slot #34 symbol #12 to slot #35 symbol #1, and SSB #63 is arranged in slot #35 from symbol #2 to symbol #5. According to the same slot configuration, SSBs #0-#31 are arranged in slots #0-#15, and SSBs #32-#63 are arranged in slots #20-#35. Radio frames with 240 kHz SCS may be used for transmitting and receiving SSBs, and radio frames with 60 kHz SCS and 120 kHz SCS may be used for transmitting and receiving data.

Figure 7:
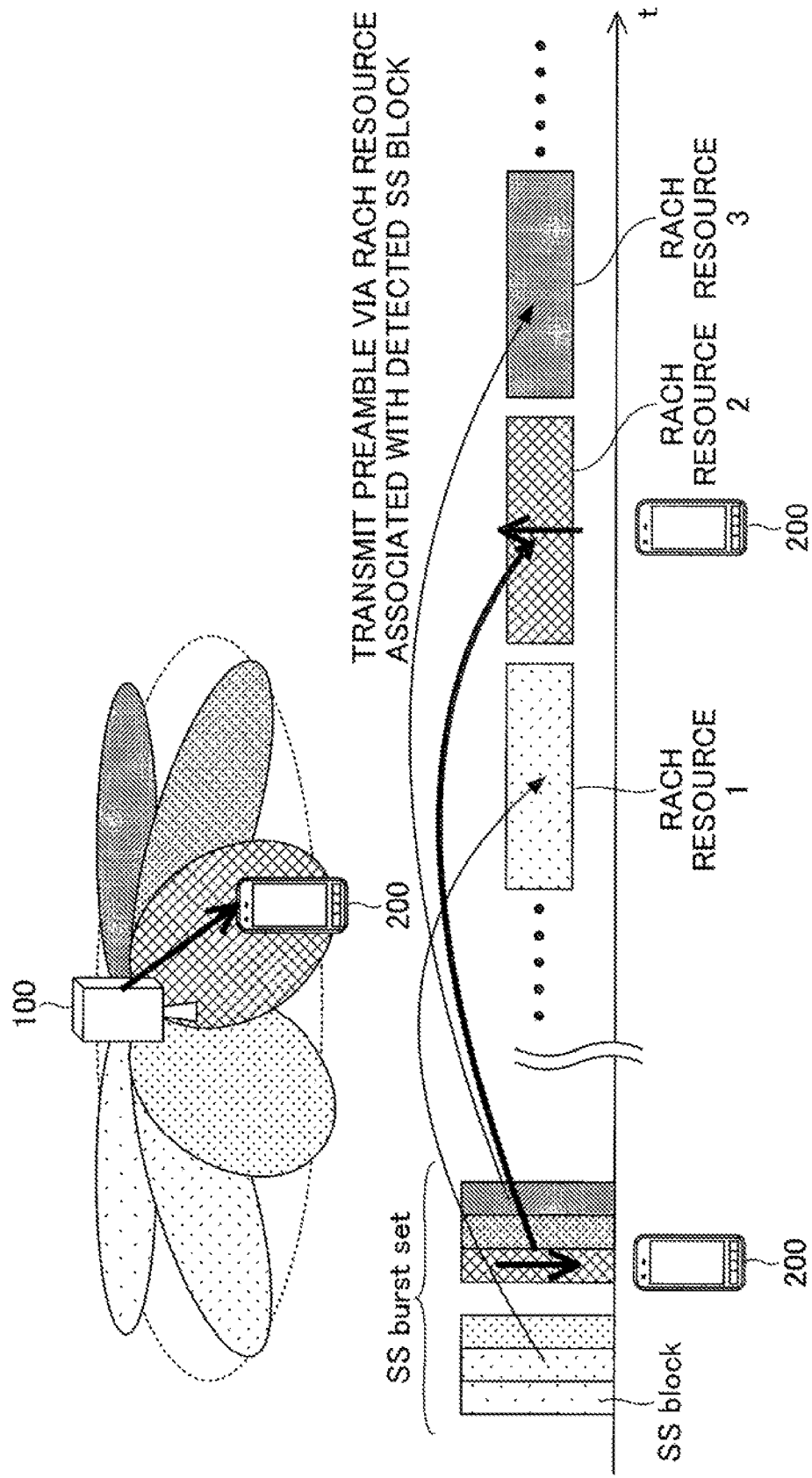
FIG. 7 is a drawing illustrating a RACH resource that is associated with an SS block according to an embodiment of the present invention.

FIG. 7 is a drawing illustrating a RACH resource that is associated with an SS block according to an embodiment of the present invention. As illustrated in FIG. 7, in NR, an SS burst set including the SS blocks associated with beams is transmitted from the base station apparatus 100. The user apparatus 200 receives a detectable SS block, and starts an initial access procedure by transmitting a preamble via a RACH resource that is associated with the received SS block. The RACH resource may be associated with a beam.

In an example illustrated in FIG. 7, the user apparatus 200 receives the fourth SS block included in the SS burst set, and transmits a preamble via a RACH resource 2 that is associated with the fourth SS block. Further, in an example illustrated in FIG. 4, the second SS block included in the SS burst set is associated with a RACH resource 1, and the sixth SS block included in the SS burst set is associated with a RACH resource 3. Further, an SS block has a corresponding SS block index. For example, an SS block index of the fourth SS block included in the SS burst set is defined as "4".

In other word, as illustrated in FIG. 7, the SS blocks may be associated with the RACH resources or preamble indexes. Further, for example, a single SS block may be associated with a plurality of RACH resources or preamble indexes. Further, each of the SS blocks may be associated with a range(s) of a plurality of RACH resources in the time direction, a plurality of RACH resources in the frequency direction, or a plurality of preamble indexes.

In NR, similar to LTE, RACH configuration tables are defined. An index specifying a table is indicated from a base station apparatus 100 to a user apparatus 200, and thus, positions of available RACH resources in the time domain, the number of RACH resources, the density of the RACH resources, etc., are indicated. Associations (correspondences) between each of the indicated available RACH resources and the SS blocks may be indicated by the base station apparatus 100 to the user apparatus 200, or may be predefined.

FIG. 8 is an example (1) of a slot format in an embodiment of the present invention. FIG. 8 illustrates an example of a slot format in NR in which consecutive two slots include a downlink slot and an uplink slot. It should be noted that there are five formats, "0", "1", "2", "3", "4" defined in an example illustrated in FIG. 8. In each of the formats, uses of symbols included in the slot are defined. The symbol type in a downlink slot is any one of a "Downlink" that is used for downlink, an "Unknown" that is not defined in terms of whether it is used for downlink or uplink, and a "NOT downlink" that is not used for downlink. The symbol type in an uplink slot is any one of a "Not uplink" that is not used for uplink, an "Unknown" that is not defined in terms of whether it is used for uplink or downlink, and an "uplink" that is used for uplink. It should be noted that one slot includes 14 symbols. In the following, an n-th symbol in a slot is described as symbol #n.

In format "0", symbols #0-#13 are used as "Unknown" in the downlink slot, and symbols #0-#13 are used as "Unknown" in the uplink slot. In format "1", symbols #0-#13 are used as "Downlink" in the downlink slot, and symbols #0-#13 are used as "Uplink" in the uplink slot. In format "2", symbols #0-#13 are used as "Downlink" in the downlink slot, and there is no definition with respect to the uplink slot. In format "3", there is no definition with respect to the downlink slot, and symbols #0-#13 are used as "Downlink" in the uplink slot. In format "4", symbol #0 is used as "Downlink", symbols #1-#12 are used as "Unknown", symbol #13 is used as "Not downlink" with respect to the downlink slot, and, symbol #0 is used as "Not uplink", symbols #1-#12 are used as "Unknown", and symbol #13 is used as "Uplink" with respect to the uplink slot. The formats illustrated in FIG. 8 are examples. Use of each symbol may be defined freely.

Figure 9:
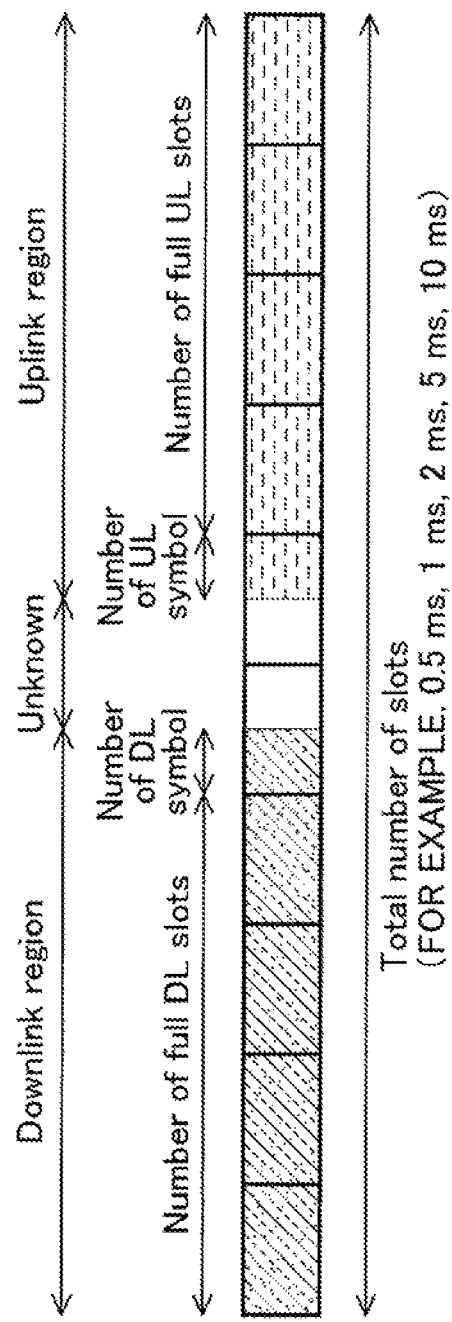
FIG. 9 is an example (2) of a slot format in an embodiment of the present invention.

FIG. 9 is an example (2) of a slot format in an embodiment of the present invention. FIG. 9 illustrates a DL/UL assignment with a format in which slots or symbols are defined as DL, UL, or Unknown in a 10-slot period.

In order to indicate the format illustrated in FIG. 9, the following parameters may be indicated from the base station apparatus 100 to the user apparatus 200:
1) Total number of slots: the total number of slots
2) Number of DL full DL slots: the total number of full-DL slots in which all symbols are arranged as DL symbols
3) Number of DL symbols: the number of DL symbols in a certain slot (fifth slot in FIG. 9)
4) Number of UL symbols: the number of UL symbols in a certain slot
5) Number of full UL slots: the total number of full-UL slots in which all symbols are arranged as UL symbols It should be noted that, with respect to the above-described parameters, it is not necessary that all of the parameters are indicated to the user apparatus 200, and some of the parameters may be predefined.

In FIG. 9, different from the format illustrated in FIG. 8: the number of slots in which only DL symbols are arranged;

the number of DL symbols in a slot in which some DL symbols are arranged; the number of UL symbols in a slot in which some UL symbols are arranged; and the number of slots in which only UL symbols are arranged, may be indicated to the user apparatus 200. Further, a total number of slots which indicates a cycle at which a format is repeated (10 slots in FIG. 9) may be indicated to the user apparatus 200, or may be predefined. The total number of slots may be indicated by a time length. For example, as illustrated in FIG. 9, 0.5 ms, 1 ms, 2 ms, 10 ms, etc., may be indicated to the user apparatus 200, or may be predefined. It should be noted that positions, whose use as DL or UL is not specified, are "unknown". In the format illustrated in FIG. 9, full DL slots in which all symbols are arranged as DL symbols; slots that include "unknown"; and full UL slots in which all symbols are arranged as UL symbols, are arranged in this order in the time domain.

Here, in NR, the number L is defined which indicates the number of transmission candidate positions of SS blocks in the time domain illustrated in FIG. 3. With respect to the above, the number of SS blocks that are actually transmitted may be freely determined, the number being equal to or less than L. Therefore, it is difficult to define a time-domain related RACH configuration table that can be adapted to all of SS block arrangement patterns, or to define positions of RACH resources in the time domain that can be adapted to all of SS block arrangement patterns.

Further, compared with the TDD configuration in LTE, more flexible DL/UL assignment is available in NR as illustrated in FIG. 8. It can be assumed that a format is used which defines a DL/UL assignment for a long period that exceeds two slots. Therefore, it is difficult to define a time-domain related RACH configuration table that can be adapted to all of the DL/UL patterns.

Further, in the case where the format as illustrated in FIG. 9 is used, it can be assumed that "UL" exists only in a slot in the second half of the total number of slots in the format. Therefore, when determining the RACH resource arrangement in the time domain, it becomes necessary to take into account the total number of slots in the format.

Figure 10:
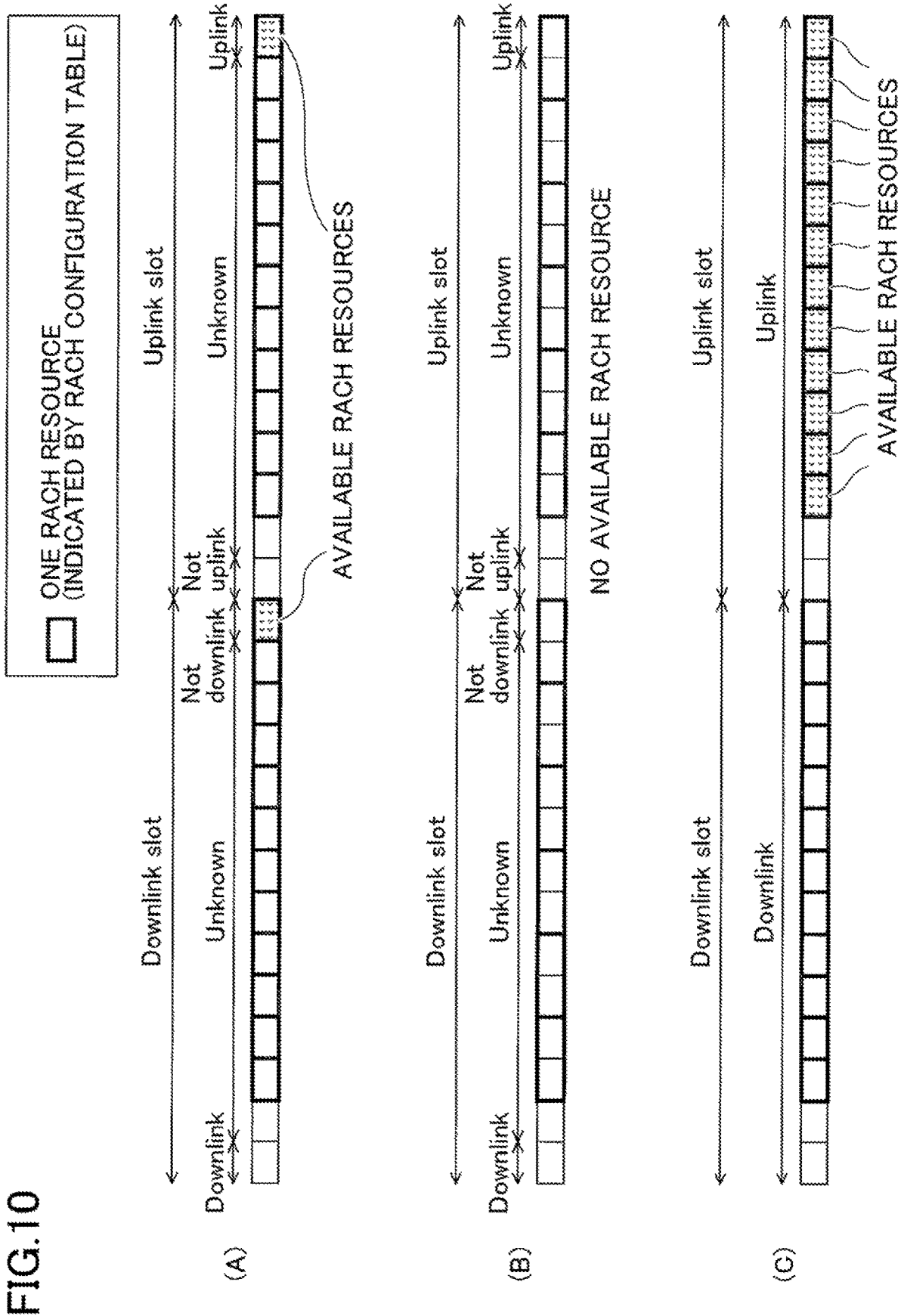
FIG. 10 is an example (1) of RACH resources in an embodiment of the present invention.

FIG. 10 is an arrangement example (1) of RACH resources in an embodiment of the present invention. FIG. 10 illustrates an example in which available RACH resources are arranged in the downlink slot and the uplink slot according to the RACH configuration table in NR. A thin-lined frame indicates a symbol, and a bold-lined frame indicates a RACH resource.

Of all RACH resources allocated at positions in the time domain based on the RACH configuration table that has been indicated to the user apparatus 200 via broadcast information, etc., or based on an index specifying the table, RACH resources that are arranged in resources (symbols) other than the resources (symbols) corresponding to "UL" may be excluded from the available RACH resources, the table being based on the DL/UL assignment that has been indicated to the user apparatus 200 via broadcast information, etc. In other words, of all RACH resources allocated at positions in the time domain based on the RACH configuration table or based on the index that specifies the table, it is possible for the user apparatus 200 to use the RACH resources other than the excluded RACH resources. Associations with the SS blocks may be defined with respect to the RACH resources other than the excluded RACH resources Further, the excluded RACH resources may be used for scheduling for data channels or control channels by the base station apparatus 100.

FIG. 10A illustrates available RACH resources based on a case where the time length of a PRACH preamble format is equal to one symbol and where the slot format is "Format 4" illustrated in FIG. 8. In "Format 4", in the downlink slot, symbol #0 is "Downlink", symbols #1 to #12 are "Unknown", and symbol #13 is "Not downlink". Further, in the uplink slot, symbol #0 is "Not uplink", symbols #1 to #12 are "Unknown", and symbol #13 is "Uplink". RACH resources that overlap symbols of "Downlink" and "Unknown" in the downlink slot are excluded, and resources that overlap symbols of "Not downlink symbol" are available resources. Further, RACH resources that overlap symbols of "Not uplink symbol" and "Unknown" in the uplink slot are excluded, and resources that overlap symbols of "Uplink" are available resources. Therefore, as illustrated in FIG. 10A, symbol #13 in the downlink slot and symbol #13 in the uplink slot are available RACH resources.

FIG. 10B illustrates available RACH resources based on a case where the time length of a PRACH preamble format is equal to two symbols and where the slot format is "Format 4" illustrated in FIG. 8. In "Format 4", in the downlink slot, symbol #0 is "Downlink", symbols #1 to #12 are "Unknown", and symbol #13 is "Not downlink". Further, in the uplink slot, symbol #0 is "Not uplink", symbols #1 to #12 are "Unknown", and symbol #13 is "Uplink". RACH resources that overlap symbols of "Downlink" and "Unknown" in the downlink slot are excluded, and RACH resources that overlap symbols of "Not downlink symbol" are available resources. Further, RACH resources that overlap symbols of "Not uplink symbol" and "Unknown" in the uplink slot are excluded, and RACH resources that overlap symbols of "Uplink" are available resources. Therefore, as illustrated in FIG. 10B, symbol #13 in the downlink slot and symbol #13 in the uplink slot are supposed to be available resources. However, because the time length of a PRACH preamble format is equal to two symbols, there is no available RACH resource.

FIG. 10C illustrates available RACH resources based on a case where the time length of a PRACH preamble format is equal to one symbol and where the slot format is "Format 1" illustrated in FIG. 8. In "Format 1", in the downlink slot, symbols #0-#13 are used as "Downlink", and, in the uplink slot, symbols #0-#13 are used as "Uplink". RACH resources that overlap symbols of "Downlink" in the downlink slot are excluded. Further, RACH resources that overlap symbols of "Uplink" in the uplink slot are available RACH resources. Therefore, as illustrated in FIG. 10C, symbol #13 in the downlink slot and symbol #13 in the uplink slot are available RACH resources.

Further, as another example, RACH resources that overlap symbols of "Downlink" and "Unknown" in the downlink slot may be excluded, and RACH resources that overlap symbols of "Not downlink symbol" may be available RACH resources. Further, as yet another example, RACH resources that overlap symbols of "Not uplink symbol" in the uplink slot may be excluded, and RACH resources that overlap symbols of "Unknown" and "Uplink" may be available RACH resources.

Figure 11:
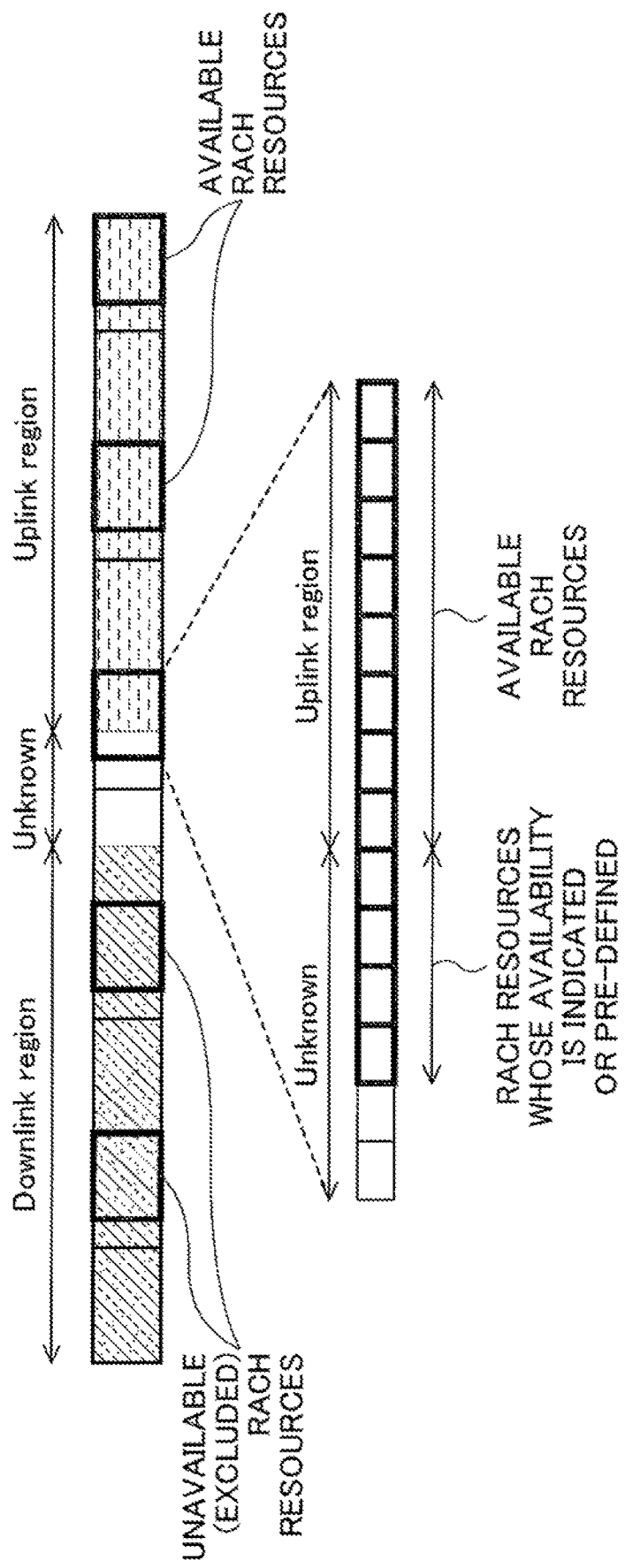
FIG. 11 is an example (2) of RACH resources in an embodiment of the present invention.

FIG. 11 is an example (2) of RACH resources in an embodiment of the present invention. Referring to FIG. 11, an example will be described in which available RACH resources according to the RACH configuration table in NR are arranged in a slot with a format illustrated in FIG. 9. A thin-lined frame indicates a symbol, and a bold-lined frame indicates a RACH resource candidate. It should be noted that FIG. 11 illustrates available RACH resources in a slot in a case where the time length of a PRACH preamble format is equal to one symbol.

As illustrated in FIG. 11, RACH resources that are allocated to "Downlink region" are excluded. With respect to the above, RACH resources that are allocated to "Uplink region" are available resources. In the slots in which "Unknown" and "Uplink region" are included as illustrated in FIG. 11, availability of the RACH resources is determined on a per symbol unit basis. RACH resources that are allocated to symbols included in the "Uplink region" are available resources. With respect to the above, availability of RACH resources that are allocated to symbols included in the "Unknown" may be indicated or may be predefined.

In other words, in the case where a DL/UL assignment with a format as illustrated in FIG. 11 is applied, RACH resources that are included in a range explicitly allocated as a DL slot or a DL symbol are excluded from available RACH resources. Further, RACH resources that overlap an Unknown range not explicitly allocated as a DL slot, a DL symbol, a UL slot, or a UL symbol are excluded from available RACH resources.

Further, as another example, in the case where a DL/UL assignment with a format as illustrated in FIG. 11 is applied, RACH resources that are included in a range explicitly allocated as a DL slot or a DL symbol are excluded from available RACH resources. Further, RACH resources that overlap an Unknown range that are not explicitly allocated as a DL slot, a DL symbol, a UL slot, or a UL symbol may be used as available RACH resources.

Further, as a yet another example, in the case where a DL/UL assignment with a format illustrated in FIG. 11 and where the total number of slots is indicated from the base station apparatus 100 to the user apparatus 200 or is predefined, RACH resources in the time domain specified as an index of the RACH configuration table may be implicitly or explicitly indicated to the user apparatus 200 based on the time length of the total number of slots.

With respect to a unit of indication of the time domain in the RACH configuration table, the time domain may be indicated by a symbol unit, by a slot unit, by a sub-frame unit or 1 ms unit, or by an SFN unit or 10 ms unit.

In the case where information indicating the time domain in the RACH configuration table is indicated by using a long time unit: RACH resources may be arranged in all of time units that are shorter than the long time unit; or an arrangement of RACH resources related to a portion with the shorter time unit may be further indicated by the RACH configuration table or may be predefined. For example, in the case where the time length is indicated using a sub-frame unit, an arrangement may be further indicated in which symbols #3 to #13 in even-numbered slots are arranged as RACH resources, based on the RACH configuration table.

Further, as another example, a DL/UL assignment with a format illustrated in FIG. 11 may be applied, and the arrangement density of RACH resources per total number of slots may be indicated based on the RACH configuration table. For example, an index of the RACH configuration table may be defined with respect to a period in which the total number of slots is repeated four times. Further, for example, an index of the RACH configuration table may be defined with respect to a period in which the total number of slots is repeated once. In other words, an absolute value of an actual repeat period is determined according to the total number of slots.

Further, as another example, an index of the RACH configuration table may be defined for each assumed total number of slots. For example, by assuming a total number of slots in 1 ms, a 1-ms period RACH resource arrangement as a high density arrangement, a 4-ms period RACH resource arrangement as a low density arrangement, etc., may be defined for each index of the RACH configuration table.

Further, the index may be used by limiting to the case in which the total number of slots that is the same as the assumed total number of slots per index of the RACH configuration table is indicated from the base station apparatus 100. Further, the index may be used even in the case where a different total number of slots is indicated from the base station apparatus 100. For example, in the case where a 4-ms period RACH resource arrangement is specified by an index of the RACH configuration table by assuming a total number of slots in 1 ms, a high density RACH resource arrangement may be performed by using the same index by assuming a total number of slots in 4 ms.

Further, as another example, the RACH configuration table may be defined in such a way that RACH resources are arranged at a period of multiples of 10 ms as an available maximum value of the total number of slots.

Figure 12:
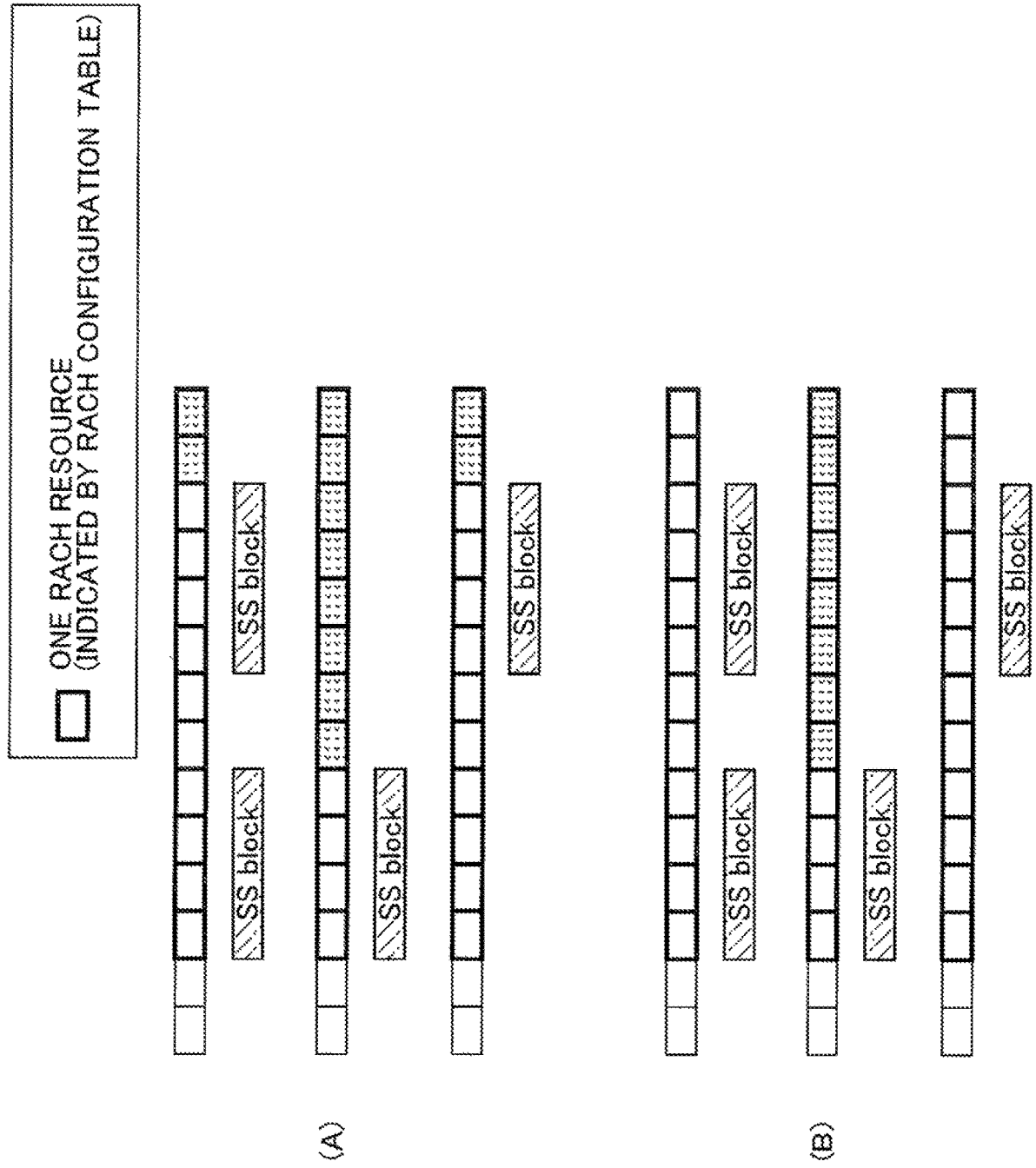
FIG. 12 is an example (3) of RACH resources in an embodiment of the present invention.

FIG. 12 is a drawing illustrating an example (3) of RACH resources in an embodiment of the present invention.

FIG. 12 illustrates an example in which available RACH resources according to the RACH configuration table in NR are arranged in slots in which SS blocks are included in the time domain. A thin-lined frame indicates a symbol, and a bold-lined frame indicates a RACH resource.

Of all time domain positions of RACH resources allocated based on the RACH configuration table indicated to the user apparatus 200 via broadcast information, etc., or based on an index that specifies the table, RACH resources arranged in slots that overlap actually-transmitted SS blocks may be excluded from RACH resources in the slot, a part or all of the RACH resources being available RACH resources. The above-described exclusion of RACH resources based on the time domain positions of the actually-transmitted SS blocks may be applied only in the case where the duplex method is TDD. Associations with the SS blocks may be defined with respect to the RACH resources other than the excluded RACH resources. Further, the excluded RACH resources may be used for scheduling for data channels or control channels by the base station apparatus 100.

FIG. 12(A) illustrates available RACH resources in a slot in a case where the time length of a PRACH preamble format is equal to one symbol. In the slot that overlaps SS blocks, RACH resources that are positioned after the last actually-transmitted SS block in the time domain may be specified as available RACH resources. In other words, in a first slot illustrated in FIG. 12A, symbols #12 and #13 are available RACH resources because SS blocks are arranged from symbol #2 to symbol #5, and from symbol #8 to symbol #11. Further, in a second slot illustrated in FIG. 12A, symbols #6 through #13 are available RACH resources because an SS block is arranged from symbol #2 to symbol #5. Further, in a third slot illustrated in FIG. 12A, symbols #12 and #13 are available RACH resources because an SS block is arranged from symbol #8 to symbol #11.

Further, as another example, FIG. 12(B) illustrates available RACH resources in a slot in the case where the time length of the PRACH preamble format is equal to one symbol. It is an example in which there are two actually-transmitted SS blocks in a slot that overlaps SS blocks. In the case where, of all the transmission candidate positions of the two SS blocks, only a first SS block in the time domain is actually transmitted, RACH resources that exist at symbols that are positioned after the symbols that include the first SS block are available RACH resources. In the case where, of all the two SS blocks, only a last SS block in the time domain is actually transmitted or the two SS blocks are actually transmitted, all RACH resources in the slots are excluded from available RACH resources. In other words, in a first slot illustrated in FIG. 12(B), there is no available RACH resource in the slot because the two SS blocks are transmitted. In a second slot illustrated in FIG. 12(B), symbols #6 through #13 are available RACH resources because the first SS block of the two SS blocks in the time domain is transmitted. In a third slot illustrated in FIG. 12(B), there is no available RACH resource in the slot because the second SS block of the two SS block transmission candidate positions in the time domain is transmitted.

Further, as another example, by further dividing the slot into the first half slot including first seven symbols and the second half slot including second seven symbols, RACH resources that exist in a half slot in which an SS block is transmitted may be excluded from the available RACH resources.

Further, as another example, independently from the DL/UL assignment or time domain positions of the SS blocks, the base station apparatus 100 may transmit, to the user apparatus 200, information indicating time domain positions of RACH resources according to the RACH configuration table.

For example, the base station apparatus 100 may transmit, to the user apparatus 200, information indicating that, of available RACH resources, the RACH resources are arranged in the k-th slot or the n-th symbol. The available RACH resources may be specified by: the symbols used as "Not downlink" and "uplink"; or the symbols arranged after the SS blocks in the time domain within the slot.

Further, as another example, different RACH configuration tables may be defined for each of the PRACH subcarrier spacings. The reason for having different RACH configuration tables defined for each of the PRACH subcarrier spacings is as follows. Even if the same preamble format is used, the preamble time lengths may be different according to the PRACH sub-carrier spacings and, as a result, if a common RACH configuration table is used, it becomes difficult to set appropriate time domain positions of the RACH resources by using an index that specifies the table by taking into account the DL/UL assignment or positions of SS blocks.

In the case where the PRACH sequence length is a long sequence, i.e., 839, and a PRACH subcarrier spacing of 1.25 kHz or 5 kHz is applied, a single RACH configuration table may be defined for long sequence.

On the other hand, in the case where the sequence length of PRACH is a short sequence (i.e., 139) and where 15 kHz or 30 kHz is applied as the PRACH sub-carrier spacing when frequency bands are equal to or less than 6 GHz, and 60 kHz or 120 kHz is applied as the PRACH sub-carrier spacing when frequency bands are equal to or greater than 6 GHz, four RACH configuration tables may be defined for the short sequence corresponding to 4 different PRACH sub-carrier spacings.

It should be noted that the RACH configuration table for the long sequence may be defined based on the 1 ms slot length. Further, RACH configuration tables may be defined based on the slot lengths corresponding to 15 kHz/30 kHz/60 kHz/120 kHz (i.e., 1 ms/0.5 ms/0.25 ms/0.125 ms).

Figure 13:
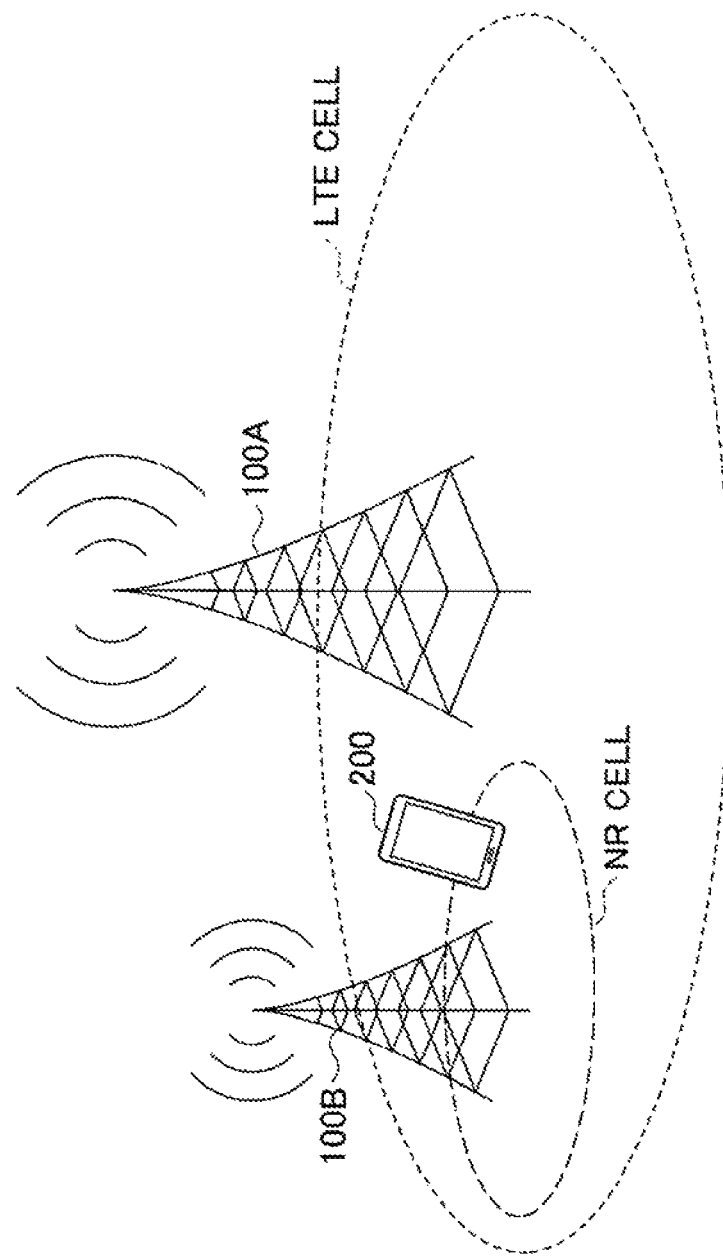
FIG. 13 is a drawing illustrating a configuration example (2) of a wireless communication system according to an embodiment of the present invention.

FIG. 13 is a drawing illustrating a configuration example (2) of a wireless communication system according to an embodiment of the present invention. As illustrated in FIG. 13, the wireless communication system includes a base station apparatus 100 and a user apparatus 200. FIG. 13 shows two base station apparatuses 100 and one user apparatus 200, which are exemplary. There may be more base station apparatuses 100 and user apparatuses 200.

The base station apparatus 100 is a communication apparatus that provides one or more cells and performs wireless communications with the user apparatus 200. For example, as illustrated in FIG. 13, a base station apparatus 100A is an LTE cell, and a base station apparatus 100B is an NR cell (hereinafter, referred to as "base station apparatuses 100" when they are not distinguished). The base station apparatus 100B is a communication apparatus that provides one or more NR cells and performs wireless communications with the user apparatus 200 according to NR. When the base station apparatus 100B communicates with the user apparatus 200 according to NR, the base station apparatus 100A and the base station apparatus 100B may communicate with the user apparatus 200 in parallel by using dual connectivity (DC). The base station apparatus 100B and the user apparatus 200 may transmit and receive signals by performing the beamforming.

In the case where the user apparatus 200 communicates with the base station 100A and the base station 100B using NSA (non-standalone) or dual connectivity as shown in FIG. 13 and where an NR cell operated by the base station 100B is a PSCell (Primary SCell) that is a primary cell in the secondary cell group, with respect to the PRACH that is transmitted in the NR cell, all arrangement methods and all indication methods of the RACH resources, for which the areas of slots or symbols indicated as DL, UL or Unknown illustrated in FIGS. 8 through 12 are taken into account, may be applied.

All arrangement methods and all indication methods of RACH resources illustrated in FIGS. 8 through 12 may be applied by taking into account the areas of slots or symbols indicated as DL, UL, or Unknown (or, flexible) specified by a TDD-UL-DL-configuration that is transmitted from an LTE cell of a primary cell group or an NR cell of a secondary cell group via RRC (Radio Resource Control) signaling for adding a PSCell.

The above-described TDD-UL-DL-configuration may be information transmitted individually or dedicatedly via RRC signaling. For example, the above-described TDD-UL-DL-configuration may be transmitted via RRC signaling called "TDD-UL-DL-config-dedicated".

The above-described TDD-UL-DL-configuration may be information transmitted in common via RRC signaling. For example, the above-described TDD-UL-DL-configuration may be transmitted via RRC signaling called "TDD-UL-DL-config-common".

Further, all arrangement methods and all indication methods of RACH resources illustrated in FIGS. 8 through 12 may be applied by taking into account the areas of slots or symbols indicated as DL, UL, or Unknown (or, flexible) specified by a TDD-UL-DL-configuration of a PCell (Primary Cell) on LTE side.

Figure 14:
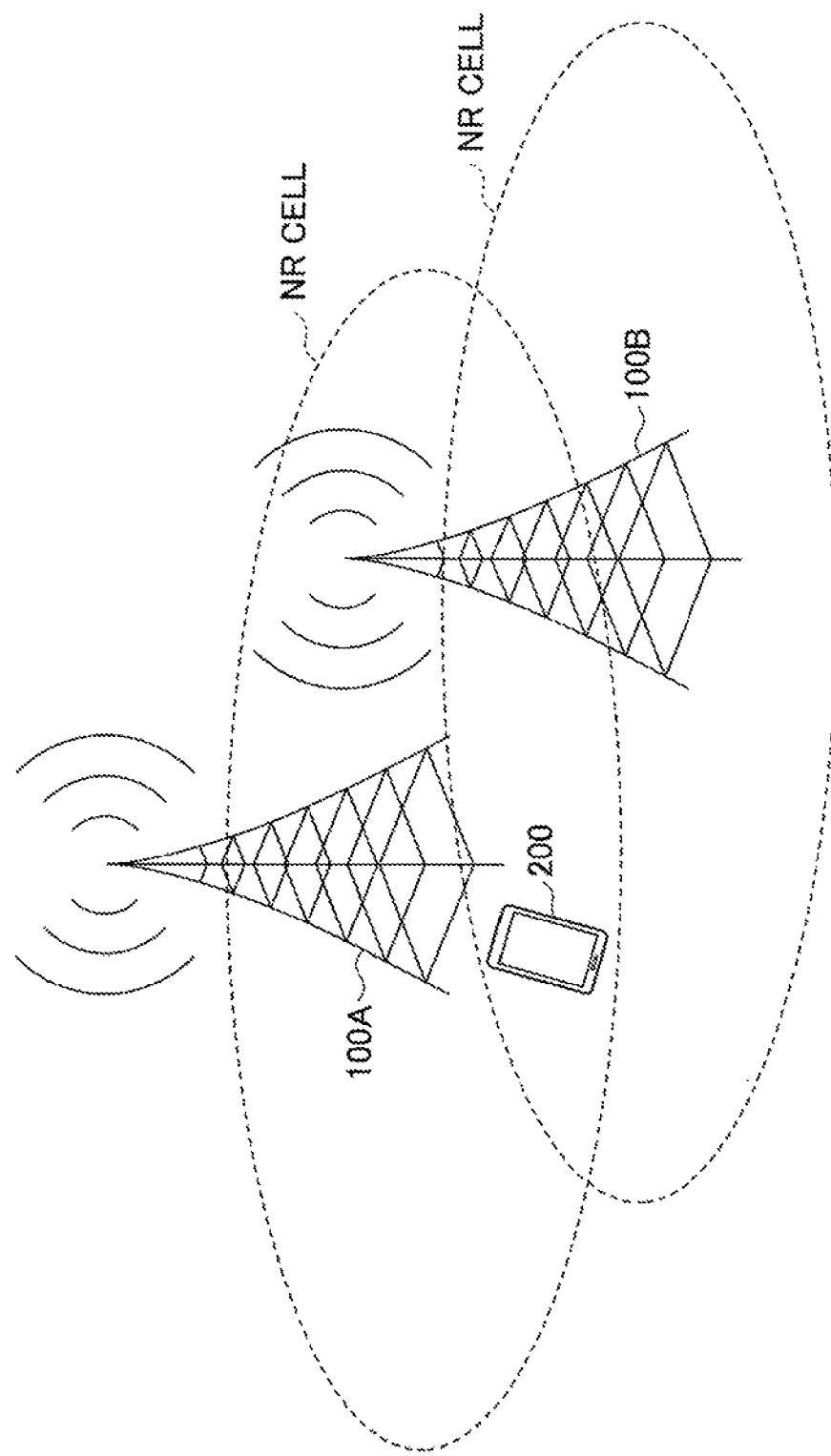
FIG. 14 is a drawing illustrating a configuration example (3) of a wireless communication system according to an embodiment of the present invention.

FIG. 14 is a drawing illustrating a configuration example (3) of a wireless communication system according to an embodiment of the present invention. As illustrated in FIG. 14, the wireless communication system includes a base station apparatus 100 and a user apparatus 200. FIG. 14 shows two base station apparatuses 100 and one user apparatus 200, which are exemplary. There may be more base station apparatuses 100 and user apparatuses 200.

The base station apparatus 100 is a communication apparatus that provides one or more cells and performs wireless communications with the user apparatus 200. For example, as illustrated in FIG. 14, a base station apparatus 100A and a base station apparatus 100B are NR cells (hereinafter, referred to as "base station apparatuses 100" when they are not distinguished). The base station apparatus 100 is a communication apparatus that provides one or more NR cells and communicates with the user apparatus 200 according to NR. When the base station apparatuses 100 communicate with the user apparatus 200 according to NR, the base station apparatus 100A and the base station apparatus 100B may communicate with the user apparatus 200 in parallel by using carrier aggregation (CA) or dual connectivity (DC). The base station apparatuses 100 and the user apparatus 200 may transmit and receive signals using the beamforming.

In the case where the wireless communication system is operated as SA (Stand alone) as illustrated in FIG. 14, with respect to the PRACH that is transmitted in the SCell (Secondary Cell), all arrangement methods and all indication methods of the RACH resources, for which the areas of slots or symbols indicated as DL, UL or Unknown illustrated in FIGS. 8 through 12 are taken into account, may be applied. It should be noted that the above-described SCell may be an SCell of a primary cell group (PCG) or an SCell of a secondary cell group (SCG).

All arrangement methods and all indication methods of RACH resources illustrated in FIGS. 8 through 12 may be applied by taking into account areas of slots or symbols indicated as DL, UL, or Unknown (or, flexible) specified by a TDD-UL-DL-configuration that is transmitted by RRC signaling for adding an SCell. The RRC signaling for adding an SCell may be referred to as "SCell addition message", for example.

The above-described TDD-UL-DL-configuration may be information transmitted individually or dedicatedly via RRC signaling. For example, the above-described TDD-UL-DL-configuration may be transmitted via RRC signaling called "TDD-UL-DL-config-dedicated".

The above-described TDD-UL-DL-configuration may be information transmitted in common via RRC signaling. For example, the above-described TDD-UL-DL-configuration may be transmitted via RRC signaling called "TDD-UL-DL-config-common".

In the case where all arrangement methods and all indication methods of RACH resources illustrated in FIGS. 8 through 12 are applied by taking into account areas of slots or symbols indicated as DL, UL, or Unknown (or, flexible) specified by a TDD-UL-DL-configuration that is transmitted by RRC signaling for adding an SCell, there is a possibility that the corresponding relationship between RACH resources and SS blocks including synchronization signals may be changed (different) between the SCell and a PCell/PSCell. In the above-described case, it may become a problem that the base station is unable to form different reception beams at the same time using analog beamforming. Therefore, with respect to the RACH resources arranged at the same positions in the time domain as PCell or PSCell, the same corresponding relationship with SS blocks as the PCell or PSCell may be maintained. With respect to the RACH resources that are not arranged at the same positions in the time domain as PCell or PSCell, the corresponding relationship between the RACH resources and the SS blocks may be mapped (applied) specifically for the SCell, or the corresponding relationship may not be mapped (applied). When the corresponding relationship is not mapped (applied), a corresponding relationship between the RACH resources and the SS blocks may be indicated from the base station 100 for the contention-free random access, or the RACH resources, to which the corresponding relationship is not mapped (applied), may be excluded from resource candidates to be used.

Further, all arrangement methods and all indication methods of RACH resources illustrated in FIGS. 8 through 12 may be applied by taking into account areas of slots or symbols indicated as DL, UL, or Unknown (or, flexible) specified by a TDD-UL-DL-configuration in the PCell in SA, or a PCell or PSCell in NSA.

In the case where arrangement methods and indication methods of RACH resources illustrated in FIGS. 8 through 12 are applied to PRACH transmission in the SCell or PSCell by taking into account areas of slots or symbols indicated as DL, UL, or Unknown (or, flexible), the arrangement method and the indication method of RACH resources may be changed according to types of cells (PCell, SCell, PSCell, etc.,) in which PRACH is transmitted.

For example, in the case where RACH resources are arranged to overlap not only a DL area but also several symbols (two or three symbols) right after the DL area, the overlapped RACH resources may be excluded from candidates to be used in order to secure a gap between the DL area and a UL area. Regarding the number of symbols necessary for the gap, the necessary number of symbols may vary according to the effects of the cell coverage or the interference between gNBs.

In the case where the cell is a PCell, a gNB may be arranged in the vicinity. However, in the case where the cell is a SCell or PSCell, a gNB may not be arranged in the vicinity. Therefore, the number of symbols of a gap provided right after the DL area in case of SCell or PSCell may be less than the number of symbols of a gap provided right after the DL area in case of PCell. For example, the number of gap symbols provided right after the DL area in case of PCell may be 3, and the number of gap symbols provided right after the DL area in case of SCell or PSCell may be 1 or 2, or zero (i.e., gap may not be provided).

In the above-described embodiment, the user apparatus 200 is enabled to use RACH resources other than the excluded RACH resources of the RACH resources at positions in the time domain allocated based on the index of the RACH configuration table indicated by the base station apparatus 100, the excluded RACH resources being excluded based on the DL/UL assignment or the SS block arrangement. Further, the RACH configuration table may be defined for each of the PRACH sub-carrier spacings.

Further, in the above-described embodiment, in the case where the user apparatus 200 communicates with the base station apparatuses 100 using dual connectivity (DC) or carrier aggregation (CA), it is possible for the user apparatus 200 to perform initial access by using RACH resources that are arranged appropriately by taking into account areas of DL, UL, or Unknown (or, flexible) specified by a TDD-UL-DL-configuration.

In other words, it is possible to efficiently indicate available resources to the user apparatus in the initial access of a wireless communication system.

(Apparatus Structure)

Next, examples of functional structures of the base station apparatus 100 and the user apparatus 200 that perform the processes and operations described above will be described. The base station apparatus 100 and the user apparatus 200 each have at least functions for performing an embodiment of the present invention. It should be noted that the base station apparatus 100 and the user apparatus 200 each may have only a part of the functions for performing an embodiment of the present invention.

Figure 15:
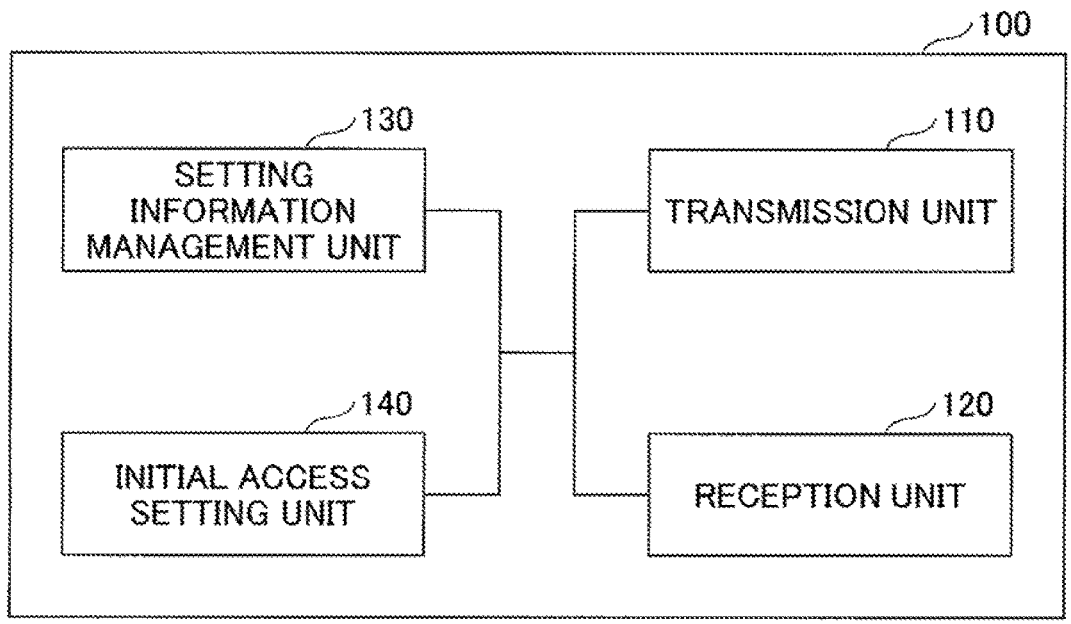
FIG. 15 is a drawing illustrating an example of a functional structure of a base station apparatus 100 according to an embodiment of the present invention.

FIG. 15 is a drawing illustrating an example of a functional structure of a base station apparatus 100. As illustrated in FIG. 15, the base station apparatus 100 includes a transmission unit 110, a reception unit 120, a setting information management unit 130, and an initial access setting unit 140. The functional structure illustrated in FIG. 15 is merely an example. Functional divisions and names of functional units may be anything as long as it can perform operations according to an embodiment of the present invention.

The transmission unit 110 has a function for generating a signal to be transmitted to the user apparatus 200 and for transmitting the signal wirelessly. The reception unit 120 has a function for receiving various signals transmitted from the user apparatus 200 and for obtaining, for example, upper layer information from the received signals. Further, the transmission unit 110 has a function for transmitting to the user apparatus 200 NR-PSS, NR-SSS, NR-PBCH, DL/UL control signals, etc. Further, the transmission unit 110 transmits to the user apparatus 200 information related to transmission power control and information related to scheduling, and the reception unit 120 receives from the user apparatus 200 a message related to a preamble and initial access.

The setting information management unit 130 stores preset setting information and various setting information items to be transmitted to the user apparatus 200. Contents of the setting information are, for example, information to be used for initial access, etc.

The initial access setting unit 140 performs control of transmitting, from the base station apparatus 100 to the user apparatus 200, a synchronization signal and system information including information used for initial access, and performs controlling initial access from the user apparatus 200.

Figure 16:
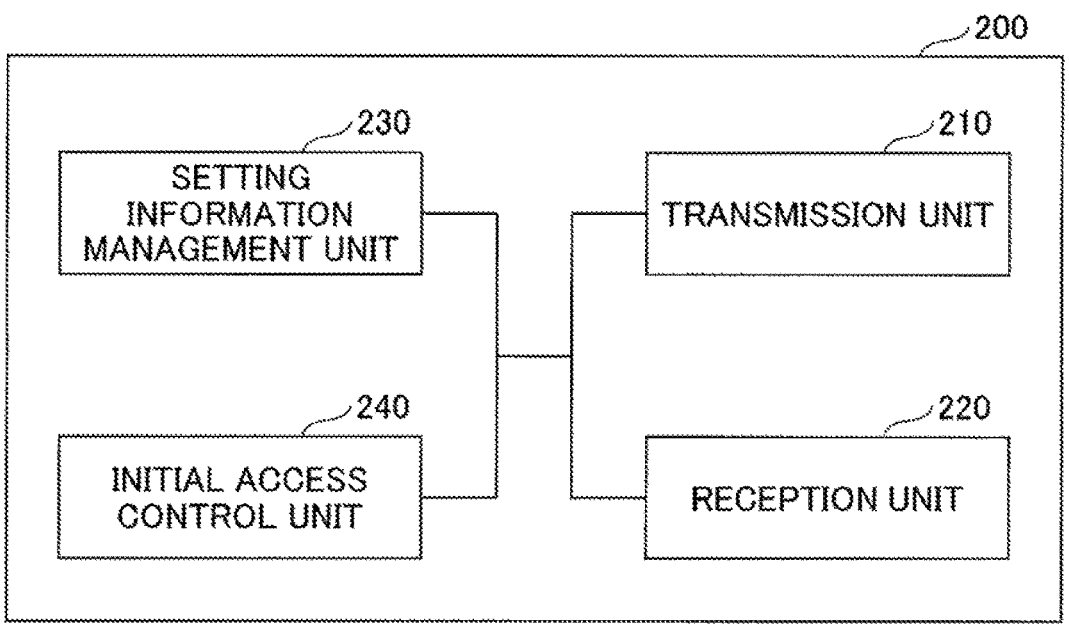
FIG. 16 is a drawing illustrating an example of a functional structure of a user apparatus 200 according to an embodiment of the present invention.

FIG. 16 is a drawing illustrating an example of a functional structure of a user apparatus 200. As illustrated in FIG. 16, the user apparatus 200 includes a transmission unit 210, a reception unit 220, a setting information management unit 230, and an initial access control unit 240. The functional structure illustrated in FIG. 16 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL control signals, etc., transmitted from the base station apparatus 100. Further, the transmission unit 210 transmits to the base station apparatus 100 a message related to a preamble and initial access, and the reception unit 220 receives from the base station apparatus 100 information used for initial access.

The setting information management unit 230 stores various setting information items received by the reception unit 220 from the base station apparatus 100. Further, the setting information management unit 230 also stores preset setting information. Contents of the setting information are, for example, information to be used for initial access, etc.

The initial access control unit 240 controls initial access of the user apparatus 200 described in an embodiment of the present invention. It should be noted that the functional units related to preamble signal transmission, etc., in the initial access control unit 240 may be included in the transmission unit 210, and the functional units related to system information reception, etc., in the initial access control unit 240 may be included in the reception unit 220.

(Hardware Structure)

In the above functional structure diagrams used for describing an embodiment of the present invention (FIG. 15 and FIG. 16), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless).

Figure 17:
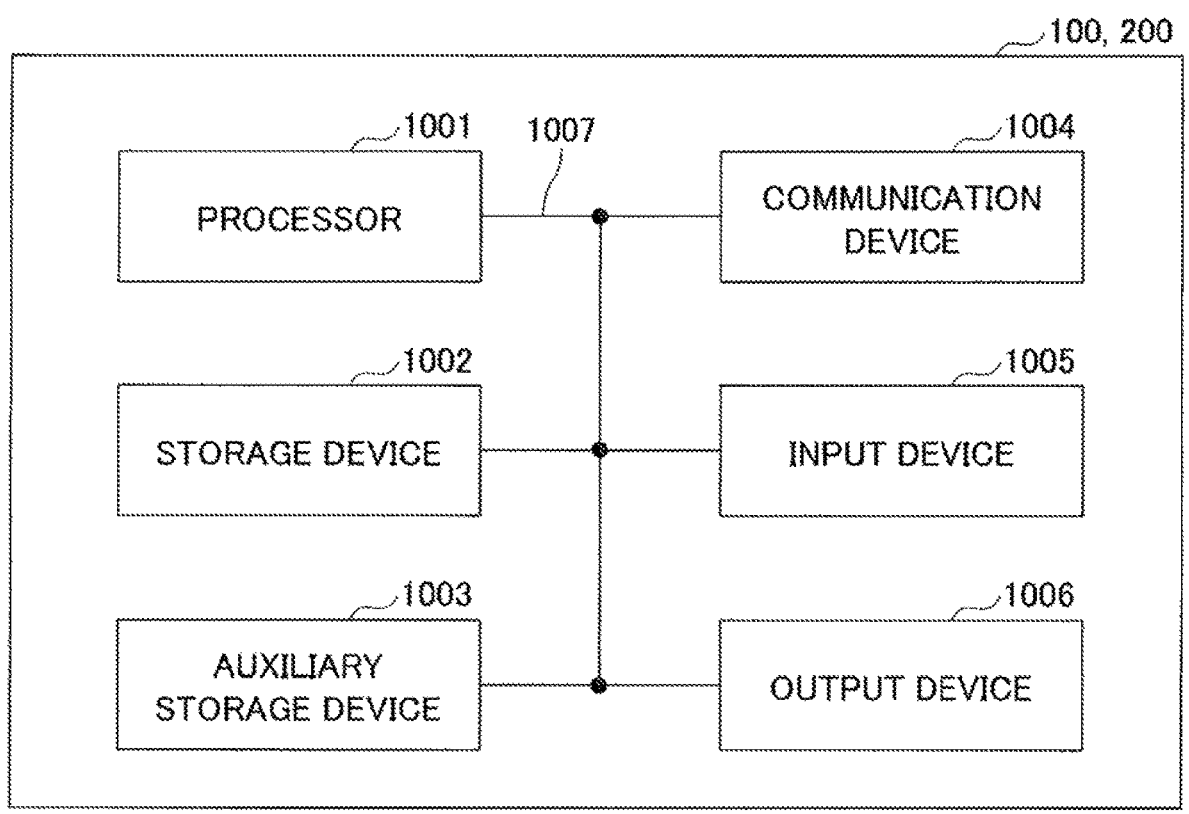
FIG. 17 is a drawing illustrating examples of hardware structures of the base station apparatus 100 and the user apparatus 200.

Further, for example, a base station apparatus 100 and a user apparatus 200 according to an embodiment of the present invention may function as computers that perform processes according to an embodiment of the present invention. FIG. 17 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the apparatuses indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage device 1002, or the like, by causing the processor 1001 to perform calculations, and by causing the processor 1001 to control communications by the communication apparatus 1004, and to control reading and/or writing data by the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage device 1003 and/or the communication apparatus 1004, writes the program, the software module, or the data to the storage device 1002, and performs various processes according to the program, the software module, or the data. As the program, a program is used that causes the computer to perform at least a part of operations according to an embodiment of the present invention described above. For example, the transmission unit 110, the reception unit 120, the setting information management unit 130, and the initial access setting unit 140 of the base station apparatus 100 illustrated in FIG. 15 may be realized by control programs that are stored in the storage device 1002 and are executed by the processor 1001. Further, for example, the transmission unit 210, the reception unit 220, the setting information management unit 230, and the initial access control unit 240 of the user apparatus 200 illustrated in FIG. 16 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is enabled to store programs (program codes), software modules, or the like, that are executable for performing processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage device 1003 may be referred to as an auxiliary storage apparatus. The above recording medium may be a database including the storage device 1002 and/or the auxiliary storage device 1003, a server, or any other appropriate medium.

The communication device 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication device 1004. Further, the transmission unit 210 and the reception unit 220 of the user apparatus 200 may be realized by the communication device 1004.

The input device 1005 is an input device that receives an external input (e.g., keyboard, mouse, microphone, switch, button, sensor). The output apparatus 1006 is an output device that outputs something to the outside (e.g., display, speaker, LED lamp). It should be noted that the input device 1005 and the output device 1006 may be integrated into a single apparatus (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a user apparatus that communicates with a base station apparatus via a radio frame is provided. The user apparatus includes a reception unit configured to receive, from the base station apparatus, a TDD-UL-DL-Configuration indicating UL (Uplink), DL (Downlink), or Unknown area in the radio frame, information related to a RACH configuration table indicating a RACH resource allocation in the radio frame in a time domain, and information excluding unavailable RACH resources in the radio frame in the time domain; a control unit configured to identify an available RACH resource based on the TDD-UL-DL-Configuration indicating UL, DL, or Unknown area in the radio frame, the information related to the RACH configuration table, and the information excluding the unavailable RACH resources; and a transmission unit configured to transmit a preamble to the base station apparatus by using the identified available RACH resource.

According to the above arrangement, it is possible for the base station apparatus to cause the user apparatus to identify a RACH resource by indicating (transmitting): a RACH resource allocation using a RACH configuration table; and information excluding unavailable RACH resources. Therefore, it is possible to efficiently indicate available resources to the user apparatus in the initial access of a wireless communication system.

The information used for excluding unavailable RACH resources of the radio frame in the time domain may be information indicating a downlink arrangement or an uplink arrangement. With the above-described arrangement, it is possible for the user apparatus to identify available RACH resources based on the DL/UL assignment.

The information indicating a downlink arrangement or an uplink arrangement may be information indicating positions in the time domain: of symbols used for downlink and symbols that are not determined to be used for downlink or uplink, included in the downlink slot; and of symbols that are not used for uplink and symbols that are not determined to be used for uplink or downlink, included in the uplink slot; or may be information indicating one or more symbols immediately following, in the time domain, the last symbol used for downlink. With the above-described arrangement, it is possible for the user apparatus to identify available RACH resources based on types of symbols in the DL/UL assignment.

The control unit may identify available RACH resources by: excluding RACH resources that are positioned in the time domain before a symbol in which the last SS block in a slot is included, based on the information used for excluding unavailable RACH resources of the radio frame in the time domain and time domain positions of received SS blocks; excluding, in the case where there are two SS block transmission candidate positions in a slot and where only a first SS block in the time domain is received, RACH resources that are positioned before a symbol in which the first SS block is included; or excluding, in the case where there are two SS blocks transmission candidate positions in a slot and where a second SS block in the time domain is received or the two SS blocks are received, all of RACH resources in the slot. With the above-described arrangement, it is possible for the user apparatus to identify available RACH resources based on the SS block arrangement.

The RACH configuration table may be defined for each of sub-carrier spacings of channels used for transmitting preambles. With the above-described arrangement, by setting (configuring) different RACH configuration tables for PRACH with different sub-carrier spacings, it is possible for the user apparatus to use RACH resources that are positioned appropriately in the time domain according to the sub-carrier spacings or that have preamble time lengths according to the sub-carrier spacings.

Further, as described above, according to an embodiment of the present invention, a base station apparatus that communicates with a user apparatus via a radio frame is provided. The base station apparatus includes a transmission unit configured to transmit, to the user apparatus, a TDD-UL-DL-Configuration indicating UL (Uplink), DL (Downlink), or Unknown area in the radio frame, information related to a RACH configuration table indicating a RACH resource allocation in the radio frame in a time domain, and information excluding unavailable RACH resources in the radio frame in the time domain; a setting unit configured to set (configure) the TDD-UL-DL-Configuration indicating UL, DL, or Unknown area in the radio frame, the information related to the RACH configuration table, and the information excluding the unavailable RACH resources; and a reception unit configured to receive a preamble from the user apparatus by using the identified available RACH resource.

According to the above arrangement, it is possible for the base station apparatus to cause the user apparatus to identify a RACH resource by indicating (transmitting): a RACH resource allocation using a RACH configuration table; and information excluding unavailable RACH resources. Therefore, it is possible to efficiently indicate available resources to the user apparatus in the initial access of a wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a user apparatus UE, or a base station eNB has been described by using functional block diagrams. However, the apparatuses may be realized by hardware, software, or a combination of hardware and software. The software executed by a processor included in a user apparatus UE according to an embodiment of the present invention and the software executed by a processor included in a base station eNB according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the arte, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

The description "based on" used in the present specification does not mean "based on only" unless otherwise specifically noted. In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that the SS blocks are examples of the SS blocks in an embodiment of the present invention. The initial access setting unit 140 is an example of a setting unit. RMSI is an example of information, which is not included in the blocks, required for initial access. The initial access control unit 240 is an example of a control unit. The RACH configuration table is an example of a RACH configuration table. The DL/UL assignment is an example of information indicating a downlink arrangement and an uplink arrangement. "Downlink slot" in FIG. 8 or "Downlink region" in FIG. 9 is an example of a downlink slot. "Uplink region" in FIG. 9 is an example of an uplink slot or symbols used for uplink. "Downlink" in FIG. 8 and a DL slot or a DL symbol in FIG. 9 are examples of symbols used for downlink. "Unknown" in FIG. 8 or FIG. 9 is an example of a symbol for which it is not defined whether it is used for downlink or uplink. "Not uplink" in FIG. 8 is an example of a symbol that is not used for uplink. TDD-UL-DL-Configuration is an example of TDD-UL-DL-configuration.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

The present application is based on and claims priority to Japanese patent application No. 2018-080215 filed on Apr. 18, 2018, the entire contents of which are hereby incorporated by reference.

DESCRIPTION OF THE REFERENCE NUMERALS

100 Base station apparatus
200 User apparatus
110 Transmission unit
120 Reception unit
130 Setting information management unit
140 Initial access setting unit
200 User apparatus
210 Transmission unit
220 Reception unit
230 Setting information management unit
240 Initial access control unit
1001 Processor
1002 Storage device
1003 Auxiliary storage device
1004 Communication device
1005 Input device
1006 Output device

What is claimed is:

1. A terminal comprising:
   a receiver configured to receive, from a base station apparatus, first configuration information indicating an Uplink, a Downlink, or a Flexible area in a radio frame, and second configuration information indicating a random access channel (RACH) resource allocation in the radio frame in a time domain;
   a processor configured to identify an available RACH resource in the radio frame based on the first configuration information and the second configuration information; and
   a transmitter configured to transmit a preamble to the base station apparatus using the identified available RACH resource,
   wherein the processor identifies in response to receiving the first configuration information by higher layers one or more symbols as a valid RACH resource, which start 2 symbols after a last downlink area and 2 symbols after a last transmitted SS block, as the available RACH resource.

2. The terminal according to claim 1, wherein the processor identifies, based on the first configuration information and the second configuration information, a resource of an Uplink area as the available RACH resource.

3. The terminal according to claim 1, wherein the processor identifies, based on the first configuration information and the second configuration information, the RACH resource that is positioned after a synchronization signal (SS) block in a time domain as the available RACH resource.

4. The terminal according to claim 1, wherein the terminal belongs to a primary secondary cell (PSCell) or a secondary cell (SCell).

5. A communication method of a terminal, the communication method comprising:
   receiving, from a base station apparatus, first configuration information indicating an Uplink, a Downlink, or a Flexible area in a radio frame, and second configuration information indicating a random access channel (RACH) resource allocation in the radio frame in a time domain;
   identifying an available RACH resource in the radio frame based on the first configuration information and the second configuration information; and
   transmitting a preamble to the base station apparatus using the identified available RACH resource,
   wherein the terminal identifies in response to receiving the first configuration information by higher layers one or more symbols as a valid RACH resource, which start 2 symbols after a last downlink area and 2 symbols after a last transmitted SS block, as the available RACH resource.

6. A base station apparatus comprising:
   a transmitter configured to transmit first configuration information indicating an Uplink, a Downlink, or a Flexible area in a radio frame, and second configuration information indicating a random access channel (RACH) resource allocation in the radio frame in a time domain;

a processor configured to identify an available RACH resource in the radio frame based on the first configuration information and the second configuration information; and a receiver configured to receive a preamble from a terminal by using the identified available RACH resource, wherein one or more symbols as a valid RACH resource are identified in response to receiving the first configuration information by higher layers, which start 2 symbols after a last downlink area and 2 symbols after a last transmitted SS block, as the available RACH resource.

7. The terminal according to claim 2, wherein the terminal belongs to a primary secondary cell (PSCell) or a secondary cell (SCell).

8. The terminal according to claim 3, wherein the terminal belongs to a primary secondary cell (PSCell) or a secondary cell (SCell).

* * * * *